United States Patent
Yoshida et al.

(10) Patent No.: US 10,612,104 B2
(45) Date of Patent: Apr. 7, 2020

(54) EXHAUST GAS TREATMENT METHOD AND EXHAUST GAS TREATMENT FACILITY

(71) Applicant: NIPPON STEEL & SUMITOMO METAL CORPORATION, Tokyo (JP)

(72) Inventors: Kazuki Yoshida, Kimitsu (JP); Toshiya Harada, Kimitsu (JP); Takashi Arai, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 559 days.

(21) Appl. No.: 14/906,680

(22) PCT Filed: Jul. 24, 2014

(86) PCT No.: PCT/JP2014/069567
§ 371 (c)(1),
(2) Date: Jan. 21, 2016

(87) PCT Pub. No.: WO2015/012354
PCT Pub. Date: Jan. 29, 2015

(65) Prior Publication Data
US 2016/0160303 A1   Jun. 9, 2016

(30) Foreign Application Priority Data

Jul. 24, 2013  (JP) .................. 2013-153536

(51) Int. Cl.
*C21B 3/06* (2006.01)
*C21C 5/52* (2006.01)
*F27D 17/00* (2006.01)

(52) U.S. Cl.
CPC .............. *C21B 3/06* (2013.01); *C21C 5/5294* (2013.01); *F27D 17/003* (2013.01); *C21C 2005/5223* (2013.01); *Y02P 10/216* (2015.11)

(58) Field of Classification Search
CPC ....................................................... C21B 3/06
See application file for complete search history.

(56) References Cited

U.S. PATENT DOCUMENTS

| 4,646,315 A | * | 2/1987 | Hixenbaugh | ......... C21C 5/5217 373/2 |
| 5,265,117 A | * | 11/1993 | Pernet | ................... C21C 5/5217 110/203 |

(Continued)

FOREIGN PATENT DOCUMENTS

| AU | 20553/95 B | 12/1995 |
| EP | 0026118 A1 | 4/1981 |

(Continued)

OTHER PUBLICATIONS

Extended European Search Report issued in corresponding European Application No. 14829151.1, dated Mar. 16, 2017.

(Continued)

*Primary Examiner* — Jenny R Wu
(74) *Attorney, Agent, or Firm* — Birch, Stewart, Kolasch & Birch, LLP

(57) ABSTRACT

An exhaust gas treatment method includes: burning a combustible component in exhaust gas by causing the exhaust gas, which is produced in an electric furnace, to flow into a slag holding furnace and supplying oxygen-containing gas into the slag holding furnace; causing the burned exhaust gas to flow from the slag holding furnace to a suction device through an exhaust gas pipe; adjusting an internal pressure of the electric furnace by introducing external air into the exhaust gas pipe through an opening portion provided in the middle of the exhaust gas pipe; and changing an area of the opening portion depending on a variation in the internal pressure of the electric furnace by using an opening area changing unit provided in the opening portion.

3 Claims, 10 Drawing Sheets

(56) References Cited

U.S. PATENT DOCUMENTS

2003/0140732 A1    7/2003   Edlinger
2014/0291901 A1   10/2014   Harada et al.
2016/0160303 A1    6/2016   Yoshida et al.

FOREIGN PATENT DOCUMENTS

| EP | 0515255 A1 | 11/1992 |
|----|----|----|
| EP | 1870479 A2 | 12/2007 |
| JP | 52-33897 A | 3/1977 |
| JP | 63-100924 A | 5/1988 |
| JP | 11-183050 A | 7/1999 |
| JP | 11-190594 A | 7/1999 |
| JP | 2001-248813 A | 9/2001 |
| JP | 2002-121612 A | 4/2002 |
| JP | 2003-520899 A | 7/2003 |
| JP | 2005-146357 A | 6/2005 |
| JP | 2009-221509 A | 10/2009 |
| KR | 10-2016-0021877 A | 2/2016 |
| WO | WO 2014/003127 A1 | 1/2014 |

OTHER PUBLICATIONS

Guozhu Ye et al., "Reduction of steel-making slags for recovery of valuable metals and oxide materials", Scandinavian Journal of Metallurgy 2003, 32, pp. 7-14.
International Search Report, dated Sep. 9, 2014, issued in PCT/JP2014/069567.
Written Opinion of the International Searching Authority, dated Sep. 9, 2014, issued in PCT/JP2014/069567.
Korean Notice of Allowance dated Jan. 23, 2017, for Korean Application No. 10-2016-7001601, with English translation.

\* cited by examiner

EXHAUST GAS TREATMENT METHOD AND EXHAUST GAS TREATMENT FACILITY

TECHNICAL FIELD OF THE INVENTION

The present invention relates to an exhaust gas treatment method and an exhaust gas treatment facility.

Priority is claimed on Japanese Patent Application No. 2013-153536, filed on Jul. 24, 2013, the content of which is incorporated herein by reference.

RELATED ART

Slag (steelmaking slag), which is produced using a converter or the like through desulfurization, dephosphorization, or decarburization refinement in a steelmaking step, contains a large amount of CaO. Therefore, the expansibility of the steelmaking slag is high, and the volume stability of the steelmaking slag is poor. Thus, in the related art, the reuse of the steelmaking slag as a cement raw material, an aggregate, or the like has been limited. However, recently, in order to promote the recycling of resources, valuable materials such as Fe or P must be separated and collected from the steelmaking slag and that the steelmaking slag is reformed into high-quality slag to be reused. To that end, in the related art, various slag treatment methods are proposed.

For example, Patent Document 1 discloses a slag treatment method including: a first step of obtaining modified slag by adding iron and steel slag to molten iron and steel in a melting furnace, adding heat and a reducing material to modify the iron and steel slag, and causing Fe, Mn, and P in the iron and steel slag to move to the molten iron and steel; and second and third steps of sequentially oxidizing Mn and P in the molten iron and steel to move to the modified slag and sequentially extracting high-Mn slag and high-P slag.

Patent Document 2 discloses a method including: charging iron and steel slag containing higher than 5 wt % of iron oxide into a steel bath containing lower than 1.5 wt % of carbon; obtaining the steel bath containing higher than 2.0 wt % of carbon by introducing carbon or a carbon carrier into the steel bath to carburize the steel bath; and reducing oxides in the iron and steel slag. In this method, when the iron and steel slag is charged into the steel bath, the iron and steel slag react vigorously with the steel bath. As a result, the foaming of the iron and steel slag (slag foaming) may occur, or the iron and steel slag may overflow from the furnace. In order to suppress slag foaming and overflowing, the carbon content of the steel bath is decreased before charging the iron and steel slag into the steel bath. As a result, when the iron and steel slag is charged into the steel bath, the reaction rate between the iron and steel slag and the steel bath decreases. As described above, in a state where the reaction rate between the iron and steel slag and the steel bath decreases, the carbon content of the steel bath increases, and then the iron and steel slag is reduced.

In addition, Non-Patent Document 1 discloses the results of a slag reduction test in which steelmaking slag powder, carbon powder, and slag reforming material powder are charged into an electric furnace. Further, Patent Document 3 discloses a method of collecting valuable metals from molten slag, the method including: reducing molten slag, which is produced through non-ferrous metal refining, into a carbonaceous reducing material in an open direct current electric furnace; and separating the molten slag into a metal layer and a slag layer.

In addition, in a reforming method disclosed in Patent Document 4, in order to melt and modify low-fluidity steelmaking slag having a low temperature, a surface of the steelmaking slag is mechanically stirred before (or after) adding or thermally spraying a reforming material to the low-fluidity steelmaking slag which is accommodated in a container. A mixed layer of the steelmaking slag and the reforming material is heated using a heating burner to obtain molten slag, and this molten slag is discharged from the container to be solidified.

PRIOR ART DOCUMENT

Patent Document

[Patent Document 1] Japanese Unexamined Patent Application, First Publication No. S52-033897

[Patent Document 2] Published Japanese Translation No. 2003-520899 of the PCT International Publication

[Patent Document 3] Australian Patent No. AU-B-20553/95

[Patent Document 4] Japanese Unexamined Patent Application, First Publication No. 2005-146357

Non-Patent Document

[Non-Patent Document 1] Scandinavian Journal of Metallurgy 2003; 32: p. 7 to 14

DISCLOSURE OF THE INVENTION

Problems to be Solved by the Invention

However, in the slag treatment method described in Patent Document 1, since the reduction treatment is performed using a converter, the molten iron and steel and the iron and steel slag are strongly stirred. Therefore, when the carbon concentration in the molten iron and steel is high during the charging of the iron and steel slag into the steel bath, the iron and steel slag is brought into contact with the molten iron and steel. As a result, a reaction between the iron and steel slag and the steel bath is promoted, and slag foaming occurs. In order to avoid the occurrence of slag foaming, the iron and steel slag is charged into the molten iron and steel having a low carbon concentration. Next, in order to promote the reduction reaction, carbon is charged into the steel bath to increase the carbon concentration in the molten iron and steel. Therefore, it is necessary to repeat batch processing. That is, in order to obtain slag having a necessary component composition, it is necessary to repeat batch processing (slag reduction treatment, and oxidation and extraction treatment of Mn and P) a plurality of times. Therefore, working efficiency and productivity decrease.

Likewise, in the slag reduction method described in Patent Document 2, the reduction treatment is performed using a converter. Therefore, in order to increase or decrease the carbon concentration in molten iron and to reduce the iron and steel slag, it is necessary to repeat batch processing such as decarburization heating and carburization reduction. Therefore, working efficiency and productivity decrease.

On the other hand, in the reduction test described in Non-Patent Document 1, a ground product of solidified cold steelmaking slag is a treatment target. In the method described in Patent Document 3, solidified cold slag is a treatment target. In order to reduce cold slag, a step of heating and melting the cold slag is necessary. Therefore, the energy consumption rate increases due to the addition of the step. As described above, in the method of the related art in which hot steelmaking slag is recycled through batch processing (Patent Documents 1 and 2), there is a problem in that the working efficiency and productivity of the slag treatment are low. On the other hand, in the method of the related art in which cold steelmaking slag is heated and melted to be recycled (Non-Patent Document 1 and Patent Document 3), there is a problem in that the energy consumption rate required for the slag treatment increases.

Therefore, the present inventors thoroughly studied a method capable of treating molten steelmaking slag (hereinafter referred to as "molten slag"), which is produced in a steelmaking step, without solidification in order to reduce the energy consumption rate; and continuously reducing molten slag in order to improve working efficiency and productivity.

When molten slag is charged into molten iron in an electric furnace, the energy consumption rate can be limited as compared to a case where cold slag is heated and melted. However, when molten slag is charged into molten iron in an electric furnace, a phenomenon occurs in which the molten slag reacts rapidly with the molten iron and boils (slag foaming). When slag foaming occurs, a phenomenon may occur in which the molten slag overflows from the electric furnace (overflowing). Accordingly, in order to prevent overflowing, it is necessary to limit the occurrence of slag foaming which causes overflowing.

In a reducing furnace (for example, converter), a reduction reaction is promoted due to a reaction between molten slag and molten iron, and C in the molten iron reduces FeO in the molten slag. Therefore, in order to improve reducing power, it is necessary to repeat decarburization and carburization. Therefore, working efficiency decreases. On the other hand, in a reduction reaction in an electric furnace, a reaction between iron (FeO) and carbon (C) in molten slag is more predominant than a reaction between the molten slag and molten iron. Accordingly, it was found that, in a case where an electric furnace is used, even when the C concentration in molten iron is low at about 1.5 mass %, molten slag can be reduced without carburization, and working efficiency can be improved. Therefore, it is considered that the use of an electric furnace instead of a reducing furnace be one of the measures to limit the occurrence of slag foaming during the charging of molten slag.

However, there may be a case where the C concentration in molten iron is high in an electric furnace. Therefore, the present inventors performed a thorough investigation and repeated an experiment regarding a method, even in the above case, capable of limiting the occurrence of slag foaming during the charging of molten slag; and appropriately reducing molten slag with high working efficiency without decarburization and carburization.

As a result, it was found that, from the viewpoint of limiting the occurrence of slag foaming during the charging of molten slag to prevent the occurrence of overflowing, it is preferable that the following methods described in (a) and (b) are adopted.

(a) Fluid molten slag having a high temperature is temporarily held in a slag holding furnace, which is arranged adjacent to an electric furnace, without directly charging the molten slag to the electric furnace. The molten slag is slowly poured from the slag holding furnace into the electric furnace while adjusting the pouring rate of the molten slag so as to prevent the above-described overflowing.

(b) A molten slag layer (preferably, inert reducing slag layer) as a buffer zone is formed on a molten iron layer in the electric furnace in advance, and the molten slag is poured from the slag holding furnace to the molten slag layer.

In this way, using the slag holding furnace, molten slag is poured onto the molten slag layer in the electric furnace while adjusting the pouring rate of the molten slag. As a result, the occurrence of rapid slag foaming can be limited during the pouring of molten slag, and molten slag can be continuously reduced in the electric furnace without performing decarburization and carburization.

However, in the above-described electric furnace, exhaust gas containing CO and the like and dust are produced during the reduction treatment of molten slag. In order to prevent the exhaust gas or the dust from leaking, it is necessary to maintain a negative internal pressure of the electric furnace. However, the emission rate of exhaust gas in the electric furnace varies depending on, for example, the pouring rate of molten slag or the progress of a slag reduction treatment. Therefore, in a case where the exhaust rate of exhaust gas is constant, when the emission rate of exhaust gas increases, the internal pressure of the electric furnace increases and a negative internal pressure may not be maintained. In addition, when the emission rate of exhaust gas decreases, the internal pressure of the electric furnace decreases significantly, and an excess amount of dust may be sucked into an exhaust path. On the other hand, for example, a configuration of adjusting the exhaust rate of exhaust gas using a damper or the like to adjust the internal pressure of the electric furnace may be considered. However, it is not necessarily easy to finely control the opening of the damper according to the emission rate of exhaust gas.

The present invention has been made in consideration of the above-described problems, and an object thereof is to provide an exhaust gas treatment method and an exhaust gas treatment facility, capable of easily adjusting the internal pressure of an electric furnace according to a variation in the emission rate of exhaust gas in the electric furnace in which molten slag is reduced.

Means for Solving the Problem

The present invention adopts the following means to solve the above-described problems and to achieve the above-described object.

(1) According to an aspect of the present invention, there is provided an exhaust gas treatment method in a slag treatment process in which molten slag produced in a steelmaking step is charged into a slag holding furnace, the molten slag is poured from the slag holding furnace into an electric furnace, which accommodates a molten iron layer and a molten slag layer formed on the molten iron layer, the molten slag is continuously reduced in the electric furnace, and valuable materials in the molten slag are collected into the molten iron layer, the method including: burning a combustible component in exhaust gas by causing the exhaust gas, which is produced in the electric furnace, to flow into the slag holding furnace and supplying oxygen-containing gas into the slag holding furnace; causing the burned exhaust gas to flow from the slag holding furnace to a suction device through an exhaust gas pipe; adjusting an internal pressure of the electric furnace by introducing external air into the exhaust gas pipe through an opening portion provided in the middle of the exhaust gas pipe; and changing an area of the opening portion depending on a variation in the internal pressure of the electric furnace by using an opening area changing unit provided in the opening portion.

(2) The exhaust gas treatment method according to (1) may further include: cooling the exhaust gas in the exhaust gas pipe by introducing external air into the exhaust gas pipe through an external air introduction port provided between the opening portion and the suction device.

(3) The exhaust gas treatment method according to (2) may further include: changing a flow rate of the external air, which is introduced through the external air introduction port, depending on a variation in temperature of the exhaust gas in the exhaust gas pipe between the opening portion and the suction device.

(4) According to another aspect of the present invention, there is provided an exhaust gas treatment facility for a slag treatment process in which molten slag produced in a steelmaking step is charged into a slag holding furnace, the molten slag is poured from the slag holding furnace into an electric furnace, which accommodates a molten iron layer and a molten slag layer formed on the molten iron layer, the molten slag is continuously reduced in the electric furnace, and valuable materials in the molten slag are collected into the molten iron layer, the facility including: an oxygen supply unit that supplies oxygen-containing gas into the slag holding furnace; an exhaust gas pipe that is connected to the slag holding furnace; a suction device that sucks exhaust gas in the slag holding furnace through the exhaust gas pipe; an opening portion that is provided in the middle of the exhaust gas pipe; a pressure detecting unit that detects an internal pressure of the electric furnace; and an opening area changing unit that changes an area of the opening portion depending on a variation in the internal pressure of the electric furnace, in which the internal pressure of the electric furnace is adjusted by causing exhaust gas, which is produced in the electric furnace, to flow into the slag holding furnace, burning a combustible component in the exhaust gas using the oxygen-containing gas in the slag holding furnace, exhausting the burned exhaust gas through the exhaust gas pipe, and introducing external air into the exhaust gas pipe through the opening portion.

(5) In the exhaust gas treatment facility according to (4), the opening area changing unit may include a sleeve that is provided around the exhaust gas pipe and slides along an axial direction of the exhaust gas pipe so as to cover at least a portion of the opening portion.

(6) The exhaust gas treatment facility according to (4) or (5) may further include: an external air introduction port that is provided in the exhaust gas pipe between the opening portion and the suction device.

(7) The exhaust gas treatment facility according to (6) may further include: a temperature detecting unit that detects a temperature of exhaust gas in the exhaust gas pipe between the opening portion and the suction device; and an external air flow rate control unit that controls a flow rate of external air, which is introduced through the external air introduction port, depending on the detected temperature.

Effects of the Invention

According to the aspects, the internal pressure of the electric furnace can be easily adjusted according to a variation in the emission rate of exhaust gas in the electric furnace in which molten slag is reduced.

EMBODIMENTS OF THE INVENTION

Figure 1:
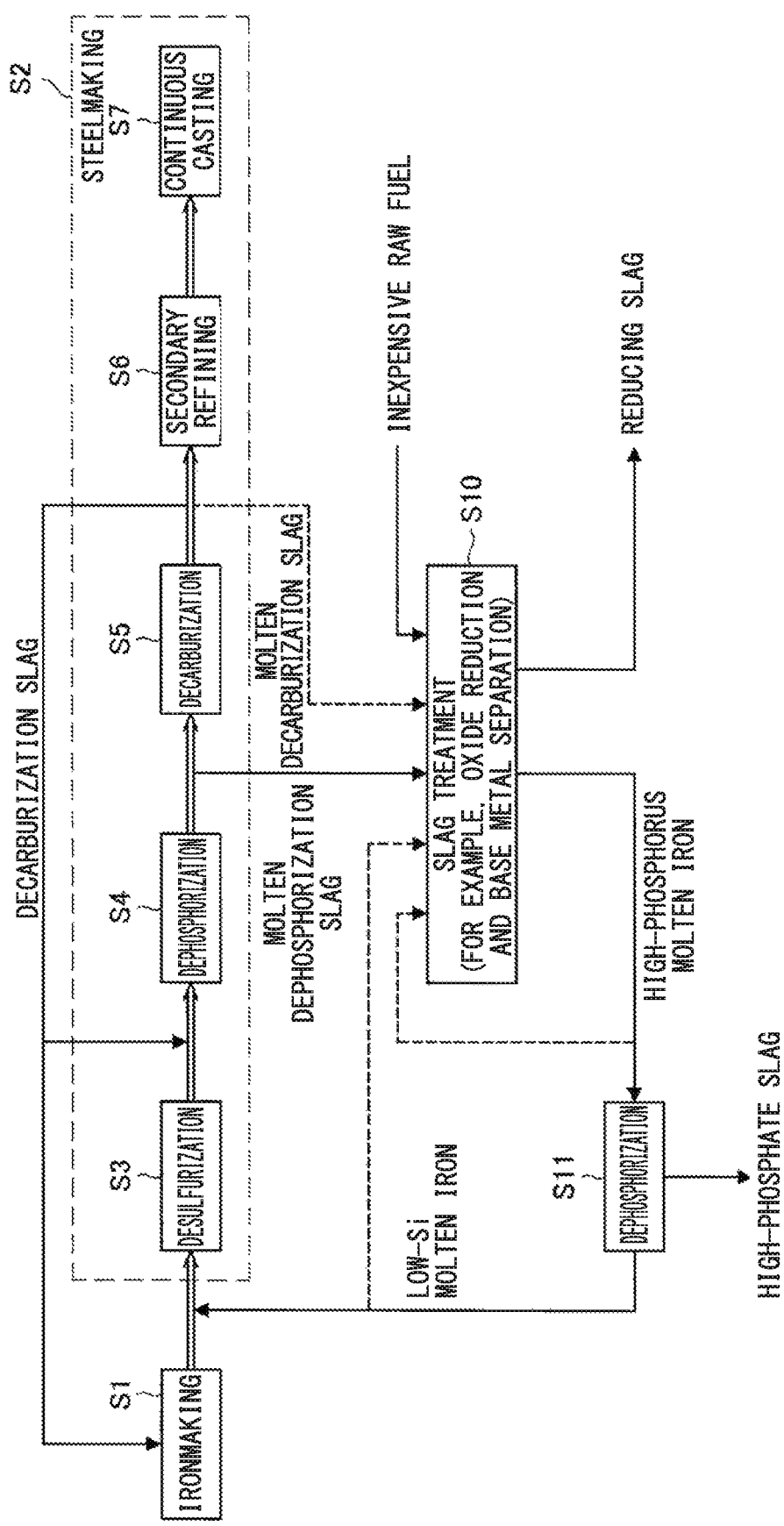
FIG. 1 is a flowchart showing a slag treatment process according to a first embodiment of the present invention.

Hereinafter, the details of a preferred embodiment of the present invention will be described with reference to the accompanying drawings. In this specification and the drawings, components having practically the same function are represented by the same reference numerals, and a description thereof will not be repeated.

1. First Embodiment

[1.1. Summary of Slag Treatment Process]

First, the summary of a slag treatment process according to a first embodiment of the present invention will be described with reference to FIG. 1. FIG. 1 is a flowchart showing the slag treatment process according to the first embodiment of the present invention.

As shown in FIG. 1, molten iron is produced using a blast furnace in an ironmaking step (S1), and molten steel is refined using a converter or the like in a steelmaking step (S2). This steelmaking step (S2) includes a desulfurization step (S3), a dephosphorization step (S4), and a decarburization step (S5) of removing sulfur, phosphorus, carbon, and the like from the molten iron. In addition, the steelmaking step (S2) includes: a secondary refining step (S6) of removing gas such as hydrogen or sulfur and the like remaining in the molten steel to adjust components; and a casting step (S7) of casting molten steel in a continuous caster.

In the steelmaking step (S2), molten iron is refined in a converter by using a flux containing calcium oxide as a major component. At this time, oxides are produced by oxidizing C, Si, P, Mn, and the like in molten iron with oxygen which is blown into the converter. Slag is produced by bonding these oxides to calcium oxide. In addition, in the desulfurization step (S3), the dephosphorization step (S4), and the decarburization step (S5), various kinds of slags (desulfurization slag, dephosphorization slag, and decarburization slag) are produced.

Hereinafter, the slags produced in the steelmaking step (S2) will be collectively called "steelmaking slag". The steelmaking slag includes desulfurization slag, dephosphorization slag, and decarburization slag. In addition, hereinafter, steelmaking slag which is in a molten state and has a high temperature will be referred to as "molten slag". Likewise, desulfurization slag, decarburization slag, and dephosphorization slag which are in a molten state will be referred to as "molten desulfurization slag", "molten dephosphorization slag", and "molten decarburization slag", respectively.

In the slag treatment step (S10), the molten slag produced in the steelmaking step (S2) is transported from the converter to an electric furnace and is continuously reduced, melted, and reformed in the electric furnace. As a result, valuable materials (valuable elements such as Fe and P) in the molten slag are collected into a molten iron layer as a layer positioned below a molten slag layer. At this time, in the electric furnace, for example, a treatment of reducing oxides such as Fe and P in the molten slag, a treatment of separating iron powder (iron) from the molten slag, or a treatment of adjusting the basicity of the molten slag is performed.

As a result, high-phosphorus molten iron containing phosphorus and the like is separated and collected from the molten slag. In addition, the molten slag as the steelmaking slag is reduced and reformed, and high-quality reducing slag corresponding to blast furnace slag is collected. This reducing slag has lower expansibility than the steelmaking slag and thus can be effectively recycled for, for example, a cement raw material, a fine aggregate, or a ceramic product.

Further, the dephosphorization treatment (S11) is performed on the high-phosphorus molten iron which is collected from the molten slag such that P in the high-phosphorus molten iron is oxidized and moves into the molten slag. As a result, the high-phosphorus molten iron is separated into high-phosphate slag and molten iron. The high-phosphate slag can be recycled as, for example, a phosphate fertilizer or a phosphate raw material. In addition, the molten iron is recycled in the steelmaking step (S2) and is charged into the converter or the like.

When molten iron, which is obtained by performing a desiliconization treatment on molten iron tapped from a blast furnace, is used as molten iron accommodated in the electric furnace, low silicon-molten iron is obtained by performing the dephosphorization treatment (S11) on the high phosphorus molten iron and can be recycled in the converter as it is.

The above-described explanations are the summary of the slag treatment process according to the embodiment. In this process, it is preferable that the molten dephosphorization slag among various molten slags produced in the steelmaking step (S2) is used as a treatment target. The molten dephosphorization slag has a lower temperature than the molten decarburization slag and contains a large amount of iron powder and phosphoric acid. Therefore, the molten dephosphorization slag is melted and reformed not in the oxidation treatment but in the reduction treatment. As a result, the collection efficiency of valuable elements (for example, Fe and P) is improved. Therefore, in the following description, an example in which the molten dephosphorization slag is used as a treatment target will be described. However, the molten slag according to the present invention is not limited to the molten dephosphorization slag, and an arbitrary steelmaking slag such as molten desulfurization slag or molten decarburization slag produced in the steelmaking step (S2) can be used.

[1.2. Configuration of Slag Treatment Facility]

Figure 2:
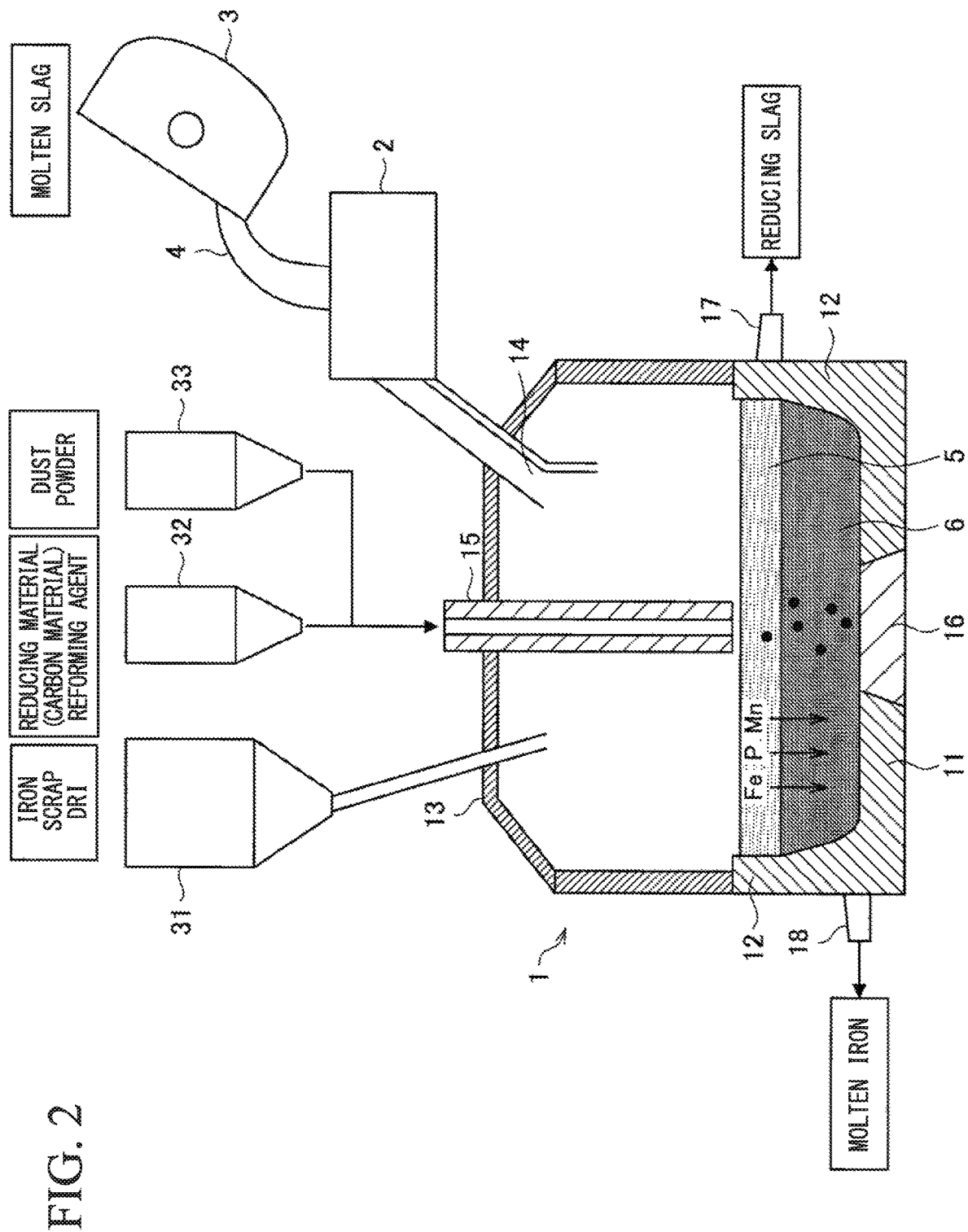
FIG. 2 is a schematic diagram showing an overall configuration of a slag treatment facility according to the first embodiment of the present invention.

Next, a slag treatment facility for realizing the above-described slag treatment process will be described with reference to FIG. 2. FIG. 2 is a schematic diagram showing an overall configuration of the slag treatment facility according to the first embodiment of the present invention.

As shown in FIG. 2, the slag treatment facility includes an electric furnace 1 and a slag holding furnace 2 that is arranged diagonally above the electric furnace 1. In addition, a slag ladle 3 is used in order to charge molten slag 4 into the slag holding furnace 2. This slag ladle 3 can reciprocate between a converter (not shown) used in the steelmaking step (S2) and the slag holding furnace 2. The molten slag 4 discharged from the converter is charged into the slag ladle 3. The slag ladle 3 transports the molten slag 4 from the converter to the slag holding furnace 2 and charges the molten slag 4 into the slag holding furnace 2. The slag holding furnace 2 can store and hold the molten slag 4. The held molten slag 4 is continuously or intermittently poured into the electric furnace 1.

It is not necessary that the molten slag 4 held in the slag holding furnace 2 is completely melted. It is only necessary that the molten slag 4 has fluidity so as to be poured from the slag holding furnace 2 into the electric furnace 1. That is, even when a portion of the molten slag 4 is melted and the remaining portion thereof is solidified, it is only necessary that the molten slag 4 has fluidity as a whole.

The electric furnace 1 reduces and reforms the molten slag 4 using auxiliary materials, for example, a reducing material such as a carbon material and a reforming material. The electric furnace 1 is a reducing electric furnace for melting and reducing the molten slag 4, for example, a fixed direct current electric furnace. A shell of the electric furnace 1 includes a furnace bottom 11, a furnace wall 12, and a furnace cover 13. A slag pouring port 14, through which the molten slag 4 is introduced from the slag holding furnace 2, is formed on the furnace cover 13. In this way, the electric furnace 1 has a closed structure except for the slag pouring port 14 such that the furnace internal space can be thermally insulated.

At the center of the electric furnace 1, an upper electrode 15 and a furnace bottom electrode 16 are arranged to be vertically opposite to each other. A voltage is applied between the upper electrode 15 and the furnace bottom electrode 16 to generate arc discharge between the upper electrode 15 and the furnace bottom electrode 16. As a result, the molten slag 4 is reduced. As shown in FIG. 2, by using a hollow electrode as the upper electrode 15, the auxiliary materials can be charged into an arc spot through the inside of the hollow electrode without separately providing a raw material charging device.

On the furnace wall 12 of the electric furnace 1, a slag hole 17 for discharging reducing slag and a tap hole 18 for discharging molten iron are provided. The slag hole 17 is arranged at a height position corresponding to the molten slag layer 5 on the molten iron layer 6. The tap hole 18 is arranged at a height position corresponding to the molten iron layer 6 on the furnace bottom side.

In addition, in FIG. 2, for example, raw supply devices 31, 32, and 33 are provided in the electric furnace 1. The raw supply device 31 is provided to supply an iron-containing material such as direct-reduced iron (DRI) into the electric furnace 1. In addition, the raw supply device 33 is provided to supply a fine powdered iron-containing material (for example, FeO powder) such as dust powder containing iron into the electric furnace 1 through the upper electrode 15 (hollow electrode). As a result, in the electric furnace 1, these iron-containing materials can be melted and recycled. In addition, the raw supply device 32 is necessary to supply auxiliary materials such as a reducing material and a reforming material required for the reduction treatment of the molten slag 4. In this example, the auxiliary materials are supplied into the electric furnace 1 through the upper electrode 15. As the reducing material, for example, a fine powdered carbon material such as coke breeze, anthracite culm, or graphite powder is used. In addition, the reforming material is an auxiliary material for adjusting the concentration of $SiO_2$, $Al_2O_3$, or MgO contained in the molten slag 4 as a major component. As such a reforming material, for example, silica sand, flyash, MgO powder, or waste refractory powder can be used.

Next, the reduction treatment of the molten slag 4 in which the electric furnace having the above-described electric furnace 1 is used will be described with reference to FIG. 2.

First, an appropriate amount of molten iron (for example, molten iron transported from a blast furnace) is accommodated in advance in the electric furnace 1 as molten seed and the molten iron layer 6. The C concentration in the molten iron is typically 1.5 mass % to 4.5 mass %. It was verified from an experiment of the present inventors that, in the electric furnace 1, the C concentration (mass %) in the molten iron and the total Fe concentration (T. Fe; mass %) in the reduced molten slag 4 (reducing slag) have a correlation with each other. For example, when the C concentration in the molten iron is higher than 3 mass %, the reduction of oxides in the molten slag 4 is promoted, and thus the total Fe concentration in the reducing slag can be reduced to be 1 mass % or lower. Accordingly, it is preferable that the C concentration in the molten iron of the molten iron layer 6 is adjusted according to the total Fe concentration required to reduce slag.

Next, in a state where the electric furnace 1 is continuously operated by supplying power thereto, the molten slag 4 is poured from the slag holding furnace 2 into the electric furnace 1 in an amount corresponding to the reduction treatment capability of the electric furnace 1 (for example, electricity supply per unit time in the electric furnace 1). The molten slag 4 poured into the electric furnace 1 forms the molten slag layer 5 on the molten iron layer 6. Further, the auxiliary materials such as the reducing material (carbon material) and the reforming material are also continuously poured into the molten slag layer 5 in the electric furnace 1, for example, through the upper electrode 15. In addition, in the electric furnace 1, the temperature of the molten iron layer 6 is controlled to be, for example, 1400° C. to 1550° C., and the temperature of the molten slag layer 5 is controlled to be, for example, 1500° C. to 1650° C. The temperature control can be realized by adjusting the supply rate of the molten slag 4 or by adjusting the electricity supply to be within a range where the electricity supply per unit time is constant.

As a result, in the electric furnace 1, the reduction reaction of the molten slag 4 in the molten slag layer 5 is promoted due to arc heat generated between the upper electrode 15 and the furnace bottom electrode 16. In this reduction treatment, oxides (for example, FeO and $P_2O_5$) contained in the molten slag 4 are reduced by C of the carbon material in the molten slag layer 5 to produce Fe and P. Fe and P move from the molten slag layer 5 to the molten iron layer 6 (molten iron) on the furnace bottom side. On the other hand, C of an excess amount of the carbon material is suspended in the molten slag layer 5 without moving to the molten iron layer 6. In addition, in the reduction treatment, the slag components in the molten slag 4 are reformed by the reforming material.

In the reduction treatment, FeO contained in the molten slag 4 which is poured into the electric furnace 1 preferentially reacts with C of the carbon material in the molten slag layer 5 before C contained in the molten iron in the molten iron layer 6 (refer to the following reaction formula (1)).

$$FeO + C \rightarrow Fe + CO\uparrow \qquad (1)$$

That is, C of the charged carbon material is suspended in the molten slag layer 5 without moving to the molten iron layer 6. Therefore, the reduction reaction based on the reaction formula (1) is not likely to occur at an interface between the molten iron layer 6 and the molten slag layer 5. Therefore, in the molten slag layer 5, the reduction reaction based on the reaction formula (1) preferentially progresses, and reduced iron (Fe) which is produced by the reduction reaction moves to the molten iron layer 6.

In this way, in the reduction treatment using the electric furnace 1, the reaction between FeO and C in the molten slag layer 5 is more predominant than the reaction FeO in the molten slag layer 5 and C in the molten iron layer 6. Accordingly, when the molten slag 4 is poured into the electric furnace 1, the molten slag layer 5 on the molten iron layer 6 functions as a buffer zone for the reaction between the poured molten slag 4 and the molten iron of the molten iron layer 6. Therefore, a rapid reaction between the molten slag 4 and the molten iron can be limited.

That is, by pouring the molten slag 4 into the molten slag layer 5 having a low FeO concentration, the FeO concentration in the poured molten slag 4 can be reduced by dilution, and direct contact between the poured molten slag 4 and the molten iron of the molten iron layer 6 can be limited. Accordingly, when the molten slag 4 is poured from the slag holding furnace 2 into the electric furnace 1, the boiling phenomenon (slag foaming) caused by a rapid reaction between the molten slag 4 and the molten iron can be limited. As a result, the phenomenon (overflowing) in which the molten slag 4 overflows from the electric furnace 1 can be avoided.

As described above, oxides contained in the molten slag 4 which is poured into the molten slag layer 5 in the electric furnace 1 are reduced such that Fe and P are collected from the molten slag 4 into the molten iron layer 6, and the slag components of the molten slag 4 are reformed. Accordingly, when the reduction treatment progresses after the pouring of the molten slag 4, the components of the molten slag layer 5 are gradually reformed from the molten slag 4 (steelmaking slag) into the reducing slag (high-quality slag corresponding to blast furnace slag). The molten slag layer 5 reformed into the reducing slag functions as a buffer zone having a lower FeO concentration. Therefore, when the molten slag 4 is newly poured from the slag holding furnace 2 into the molten slag layer 5, the occurrence of slag foaming can be reliably limited.

In addition, when the reduction treatment progresses, Fe moves into the molten iron. Therefore, the thickness of the molten iron layer 6 gradually increases.

From the viewpoint of exhibiting the function as the buffer zone, the thickness of the molten slag layer 5 is preferably 100 mm to 600 mm and more preferably 100 mm to 800 mm. Therefore, when the thickness of the molten slag layer 5 reaches a predetermined value by pouring the molten slag 4 thereinto, the slag hole 17 is opened to discharge the reducing slag of the molten slag layer 5 to the outside of the electric furnace 1. In addition, when the interface of the molten iron layer 6 approaches the slag hole 17, the tap hole 18 is opened to discharge the molten iron (for example, high-P molten iron) of the molten iron layer 6. In this way, the reducing slag is intermittently discharged and collected from the slag hole 17 of the electric furnace 1. In addition, the molten iron is intermittently discharged and collected from the tap hole 18 of the electric furnace 1. As a result, in the electric furnace 1, the reduction treatment of the molten slag 4 can be continued without interruption.

In addition, during the operation of the electric furnace 1 (that is, during the reduction treatment), oxides of the molten slag 4 are reduced using C of the carbon material to produce high-temperature exhaust gas containing CO, $H_2$, and the like. For example, when iron oxide is reduced, CO gas is produced due to the reduction reaction based on the reaction formula (1). This exhaust gas flows into the slag holding furnace 2 through the slag pouring port 14 of the electric furnace 1 and is discharged to the outside through the inside of the slag holding furnace 2 as an exhaust path. By using the closed electric furnace 1 and using the slag holding furnace 2 as an exhaust path for the exhaust gas as described above, the internal atmosphere of the electric furnace 1 is maintained to be a reducing atmosphere containing, as major components, CO gas produced by the reduction reaction and $H_2$ produced from the carbon material (reducing material). Accordingly, an oxidation reaction on the surface of the molten slag layer 5 can be prevented.

[1.3. Configuration of Slag Holding Furnace]

Figure 3:
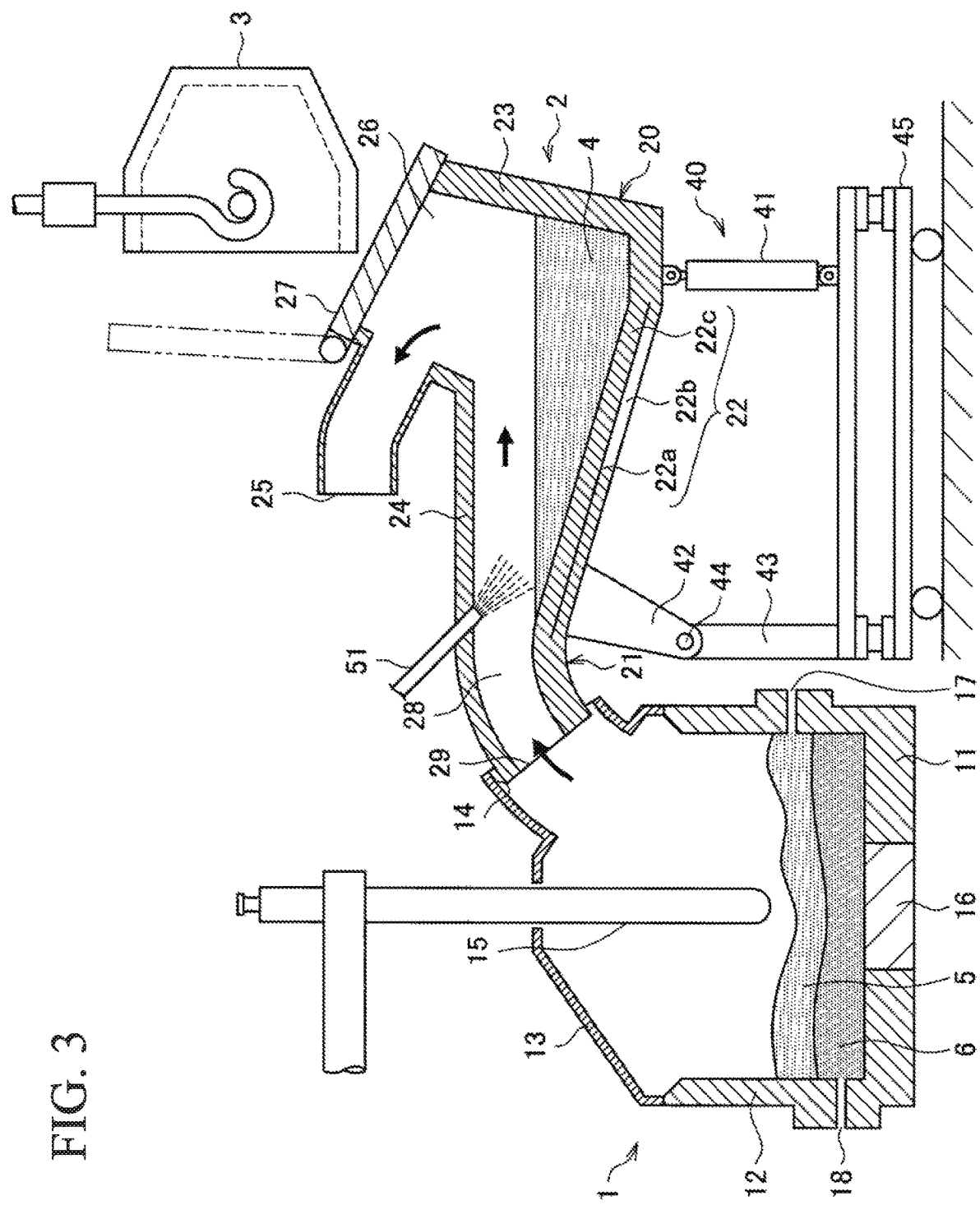
FIG. 3 is a vertical cross-sectional view showing a slag holding furnace (holding posture) according to the first embodiment of the present invention.
Figure 4:
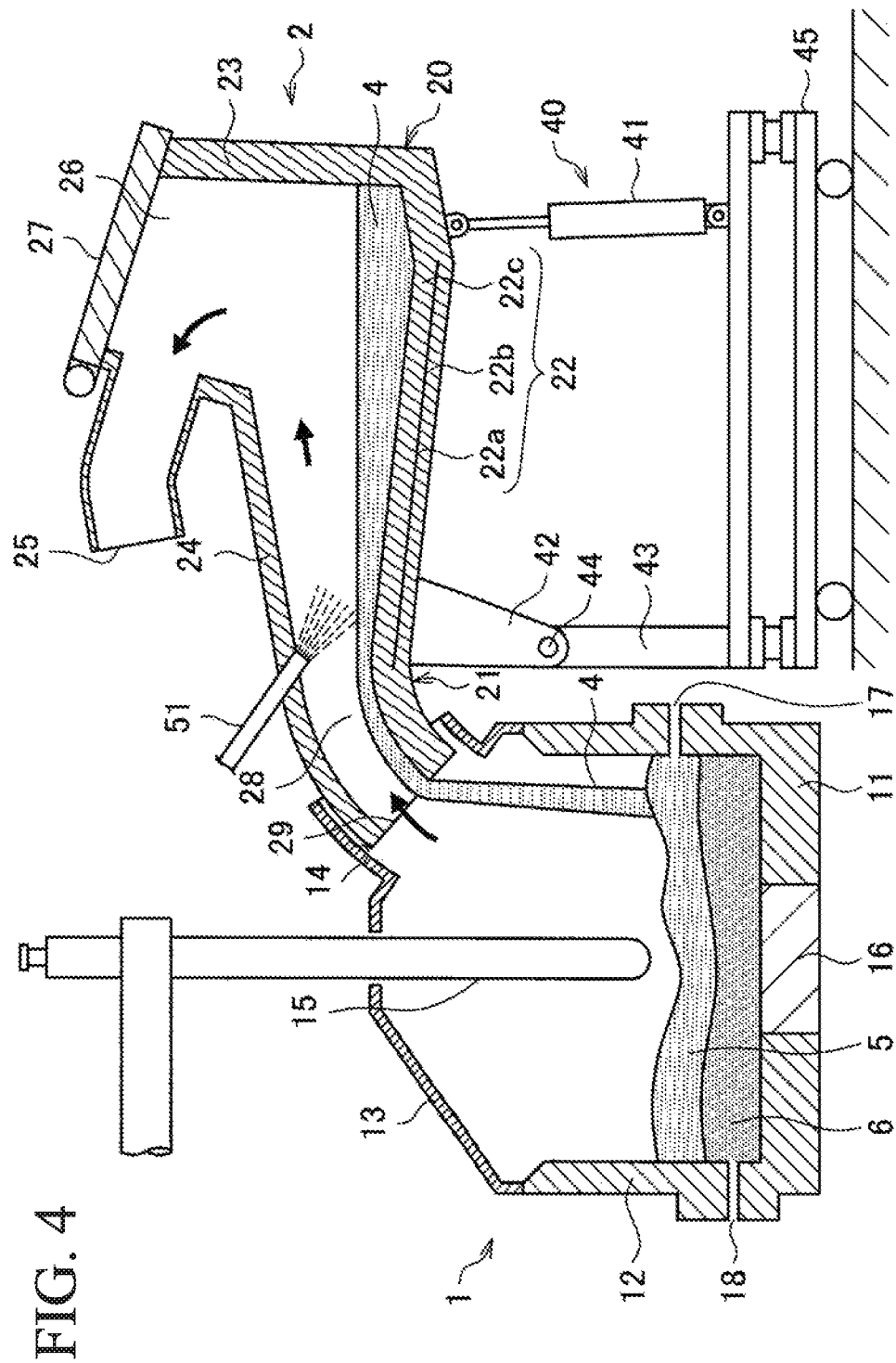
FIG. 4 is a vertical cross-sectional view showing the slag holding furnace (pouring posture) according to the first embodiment of the present invention.

Next, the configuration of the slag holding furnace 2 according to the embodiment will be described in detail with reference to FIGS. 3 and 4. FIG. 3 is a vertical cross-sectional view showing the slag holding furnace 2 (holding posture) according to the embodiment. FIG. 4 is a vertical cross-sectional view showing the slag holding furnace 2 (pouring posture) according to the embodiment.

As shown in FIG. 3, the slag holding furnace 2 is a heat-resistant container and has functions of holding the molten slag 4 having a high temperature and pouring the molten slag 4 into the electric furnace 1. The slag holding furnace 2 holds the molten slag 4, has a structure in which the pouring rate of the molten slag 4 into the electric furnace 1 can be adjusted, and functions as an exhaust path for the exhaust gas produced from the electric furnace 1. The slag holding furnace 2 includes: a slag holding furnace body 20 (hereinafter, referred to as "furnace body 20") for storing and holding the molten slag 4; and a pouring hole portion 21 for pouring the molten slag 4 from the inside of the furnace body 20 into the electric furnace 1.

The furnace body 20 is a closed container including a lower wall 22, a side wall 23, and an upper wall 24 and has an internal space for storing the molten slag 4. The lower wall 22 includes a shell 22a, a heat insulator 22b that is provided outside the shell 22a, and a lining refractory 22c that is provided inside the shell 22a. Therefore, the lower wall 22 has superior strength and heat resistance. The lining refractory is also provided inside the side wall 23 and the upper wall 24.

A gas discharge port 25 and a slag pouring port 26 are provided on an upper portion of the furnace body 20 on the furnace cover 27 side. The gas discharge port 25 is an exhaust port for discharging the exhaust gas of the electric furnace 1 and is connected to an exhaust gas pipe 55 described below. A negative internal pressure of the slag holding furnace 2 is maintained by a suction device such as a blower 56 connected to the exhaust gas pipe 55. The slag pouring port 26 is an opening for pouring the molten slag 4 into the furnace body 20 from the slag ladle 3 provided above the slag holding furnace 2. The openable furnace cover 27 is provided in the slag pouring port 26. When the molten slag 4 is poured from the slag ladle 3 into the furnace body 20, the furnace cover 27 is opened. On the other hand, while the molten slag 4 is not poured from the slag ladle 3 into the furnace body 20, the furnace cover 27 is closed to close the slag pouring port 26. As a result, the permeation of external air into the furnace body 20 can be prevented, and a constant internal temperature of the furnace body 20 can be maintained.

The pouring hole portion 21 is a cylindrical portion provided in the furnace body 20 on the electric furnace 1 side. The internal space of the pouring hole portion 21 is used as a slag pouring path 28 for pouring the molten slag 4 from the furnace body 20 into the electric furnace 1. At a tip end of the pouring hole portion 21, a pouring hole 29 connected to the slag pouring path 28 is provided. The length of the slag pouring path 28 in the vertical direction of the slag holding furnace 2 and the length of the slag pouring path 28 in the width direction of the slag holding furnace 2 (direction perpendicular to the plane of FIG. 3) are shorter than the size of the internal space of the furnace body 20. The slag pouring path 28 is downwardly curved toward the pouring direction. In addition, the internal space of the furnace body 20 gradually becomes narrow toward the pouring hole portion 21 side. By setting the shapes of the furnace body 20 and the pouring hole portion 21 to be as described above, the pouring rate of the molten slag 4 can be accurately adjusted when the molten slag 4 is poured from the inside of the furnace body 20 into the electric furnace 1.

The pouring hole portion 21 of the slag holding furnace 2 is connected to the slag pouring port 14 of the electric furnace 1. As shown in FIGS. 3 and 4, the slag pouring port 14 of the electric furnace 1 is larger than the pouring hole portion 21 of the slag holding furnace 2. That is, in the embodiment, a connection structure is adopted in which a tip end of the pouring hole portion 21 is inserted into the slag pouring port 14 in a state where a gap is present between an outer wall surface of the pouring hole portion 21 and an inner wall surface of the slag pouring port 14. The connection structure between the pouring hole portion 21 and the slag pouring port 14 is not limited to this embodiment. For example, a connection structure in which the pouring hole portion 21 and the slag pouring port 14 are air-tightly connected to each other through bellows or the like, or a connection structure in which a gap between the pouring hole portion 21 and the slag pouring port 14 is filled with a filler can be adopted.

According to the structure of the slag holding furnace 2, when the suction device (refer to FIG. 5) such as the blower 56 is operated in a state where the furnace cover 27 is closed, the internal pressure of the slag holding furnace 2 is negative. When the internal pressure of the slag holding furnace 2 is negative, the slag holding furnace 2 functions as an exhaust path for the exhaust gas produced from the electric furnace 1. That is, as indicated by an arrow in FIG. 3, the exhaust gas containing CO, $H_2$, and the like produced due to the reduction treatment in the electric furnace 1 flows into the furnace body 20 of the slag holding furnace 2, in which a negative internal pressure is maintained, through the slag pouring port 14 of the electric furnace 1 and the pouring hole portion 21 of the slag holding furnace 2. The negative internal pressure of the slag holding furnace 2 is maintained. Therefore, even when external air is introduced through the gap of the connection portion between the electric furnace 1 and the slag holding furnace 2, the exhaust gas in the electric furnace 1 does not leak to the outside through the gap. Further, the exhaust gas flowing into the slag holding furnace 2 is discharged from the gas discharge port 25 through the furnace body 20. In this way, the exhaust gas discharged from the slag holding furnace 2 is treated by an exhaust gas treatment facility (not shown) described below.

In addition, a tilting device 40 is provided in a lower portion of the furnace body 20 of the slag holding furnace 2. The tilting device 40 has a function of tilting the slag holding furnace 2 toward the pouring hole portion 21 side to pour the molten slag 4 from the inside of the furnace body 20 into the electric furnace 1 through the pouring hole portion 21. This tilting device 40 includes a cylinder 41, support members 42 and 43, a tilting shaft 44, and a carriage 45.

The cylinder 41 is configured of a hydraulic cylinder and generates power for tilting the slag holding furnace 2. An upper end of the cylinder 41 is connected to a position on the lower wall 22 of the furnace body 20 which is distant from the electric furnace 1 such that the slag holding furnace 2 can be tilted toward the electric furnace 1 side. A lower end of the cylinder 41 is connected to the top surface of the carriage 45. The tilting shaft 44 is provided below the pouring hole portion 21 of the slag holding furnace 2 and functions as a central shaft of the tilting operation of the slag holding furnace 2. The support members 42 and 43 are connected to each other so as to be pivotable around the tilting shaft 44. An upper end of the support member 42 is connected to a lower portion of the pouring hole portion 21. A lower end of the support member 43 is connected to the top surface of the carriage 45. The slag holding furnace 2 is tiltably supported by the cylinder 41, the support members 42 and 43, and the tilting shaft 44.

Using the tilting device 40 having the above-described structure, the slag holding furnace 2 can be tilted centering on the tilting shaft 44. As a result, the posture of the slag holding furnace 2 can be changed to any one of the holding posture (FIG. 3) and the pouring posture (FIG. 4). When the posture of the slag holding furnace 2 is maintained at the holding posture, as shown in FIG. 3, the molten slag 4 is held in the furnace body 20 without being poured from the slag holding furnace 2 into the electric furnace 1. On the other hand, when the posture of the slag holding furnace 2 is maintained at the pouring posture, as shown in FIG. 4, the molten slag 4 is poured from the slag holding furnace 2 into the electric furnace 1.

When the posture of the slag holding furnace 2 is changed from the holding posture to the pouring posture, the slag holding furnace 2 is tilted toward the electric furnace 1 centering on the tilting shaft 44 by extending the cylinder 41 to lift up a rear portion of the furnace body 20. As a result, as shown in FIG. 4, the position of the pouring hole portion 21 is lower than the furnace body 20. Therefore, the molten slag 4 held in the furnace body 20 flows to the pouring hole portion 21 side and is poured from the pouring hole 29 into the electric furnace 1 through the slag pouring path 28. At this time, the pouring rate of the molten slag 4 can be adjusted by controlling the extension length of the cylinder 41 to adjust the tilting angle of the slag holding furnace 2.

On the other hand, when the posture of the slag holding furnace 2 is changed from the pouring posture to the holding posture, the height of the furnace body 20 on the cylinder side returns to the height of the holding posture by shrinking the cylinder 41. As a result, as shown in FIG. 3, the position of the pouring hole portion 21 is higher than the furnace body 20, and the liquid level of the molten slag 4 in the furnace body 20 is lower than the slag pouring path 28. Therefore, the molten slag 4 is held in the furnace body 20 without being poured into the electric furnace 1.

In addition, the carriage 45 movably supports the tilting device 40. By moving the slag holding furnace 2 backward or forward using the carriage 45, the inspection, exchange, repair, and the like of the slag holding furnace 2 can be easily performed.

By tilting the slag holding furnace 2 using the tilting device 40 as described above, the molten slag 4 can be intermittently poured into the electric furnace 1, or the pouring rate thereof can be adjusted. When the molten slag 4 is poured into the electric furnace 1, it is preferable that the molten slag 4 is intermittently poured while appropriately adjusting the pouring rate of the molten slag 4 (that is, the tilting angle of the slag holding furnace 2) using the tilting device 40 such that the poured molten slag 4 does not overflow due to a rapid reaction with the molten iron in the electric furnace 1. When the pouring rate of the molten slag 4 is fast during the pouring of the molten slag 4, slag foaming occurs in the electric furnace 1, which may cause overflowing to occur. In this case, it is preferable that the pouring of the molten slag 4 is temporarily stopped by reducing the tilting angle of the slag holding furnace 2 using the tilting device 40 or that the reaction between the molten slag 4 and the molten iron in the electric furnace 1 is limited by reducing the pouring rate of the molten slag 4.

In addition, the pouring rate of the molten slag 4 per unit time using the slag holding furnace 2 is determined according to the reduction treatment capability of the electric furnace 1. The reduction treatment capability of the electric furnace 1 depends on the electricity supply per unit time to the electric furnace 1, for example, electricity consumed when a current flows by applying a voltage between the upper electrode 15 and the furnace bottom electrode 16 in the electric furnace 1. Therefore, the pouring rate of the molten slag 4 per unit time may be determined based on electric energy which is calculated based on an electric power consumption rate required for the reduction treatment of the molten slag 4, a voltage applied between the upper electrode 15 and the furnace bottom electrode 16, and a current flowing between the electrodes.

An oxygen gas supply nozzle 51 shown in FIGS. 3 and 4 will be described below in detail as the configuration of the exhaust gas treatment facility.

[1.4. Configuration of Exhaust Gas Treatment Facility]

Figure 5:
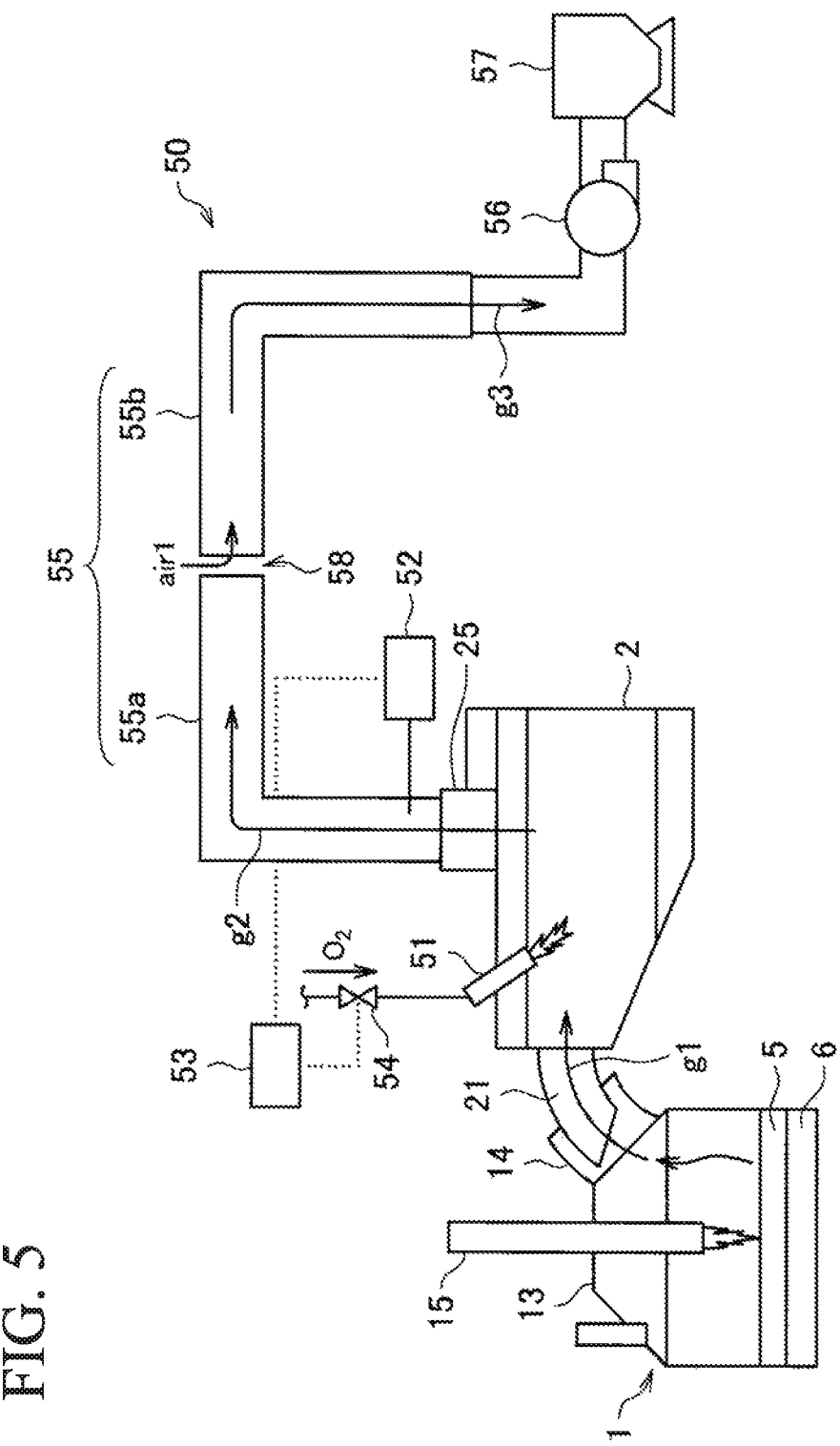
FIG. 5 is a schematic diagram showing a configuration of an exhaust gas treatment facility according to the first embodiment of the present invention.

Next, the exhaust gas treatment facility which is incidental to the slag treatment facility will be described with reference to FIG. 5. FIG. 5 is a schematic diagram showing a configuration of the exhaust gas treatment facility according to the embodiment.

As shown in FIG. 5, THE exhaust gas treatment facility 50 includes: the oxygen gas supply nozzle 51 that is provided in the slag holding furnace 2; the exhaust gas pipe 55 that is connected to the gas discharge port 25 of the slag holding furnace 2; the blower 56 that sucks the exhaust gas in the slag holding furnace 2 though the exhaust gas pipe 55; and a dust collector 57 that is provided at an end point of the exhaust gas pipe 55 after the blower 56. The blower 56 is an example of the suction device according to the embodiment of the present invention. In another embodiment, a suction device other than the blower 56 may be used.

As described above, exhaust gas g1 containing CO and the like, which are produced by the reduction reaction of iron oxide in the electric furnace 1, is caused to flow into the slag holding furnace 2 through the slag pouring port 14 of the electric furnace 1. The oxygen gas supply nozzle 51 is an oxygen supply unit that supplies oxygen gas into the slag holding furnace 2. As a result, in the slag holding furnace 2, combustion (oxidation reaction) based on the following reaction formula (2) occurs such that CO is changed into $CO_2$. Here, the supply rate of oxygen gas using the oxygen gas supply nozzle 51 is appropriately controlled according to the emission rate of CO gas in the electric furnace 1. As a result, CO gas which is a combustible component in the exhaust gas g1 can be completely burned. $CO_2$ gas which is produced by completely burning CO gas contained in the exhaust gas g1 is discharged as exhaust gas g2 from the gas discharge port 25 into the exhaust gas pipe 55.

$$2CO+O_2 \rightarrow 2CO_2 \qquad (2)$$

In the embodiment, in order to completely burn CO gas in the exhaust gas g1, an analyzer 52 is provided at a position of the exhaust gas pipe 55 adjacent to the gas discharge port 25 of the slag holding furnace 2. This analyzer 52 is connected to a concentration indicating controller 53. The analyzer 52 analyzes components of the exhaust gas g2 in the exhaust gas pipe 55 to calculate the CO concentration and the $O_2$ component. The concentration indicating controller 53 controls the supply rate of oxygen gas to the oxygen gas supply nozzle 51 according to the CO concentration and the $O_2$ concentration measured by the analyzer 52. More specifically, the concentration indicating controller 53 controls the supply rate of oxygen gas to the oxygen gas supply nozzle 51 using a valve 54 or the like such that the CO concentration in the exhaust gas pipe 55 is substantially 0% and that the $O_2$ concentration in the exhaust gas pipe 55 is a value which is higher than 0% and is as close to 0% as possible.

For example, when the CO concentration measured by the analyzer 52 is higher than 0%, the concentration indicating controller 53 increases the supply rate of oxygen gas to the oxygen gas supply nozzle 51. As a result, CO gas is completely burned in the slag holding furnace 2 and is prevented from flowing into the exhaust gas pipe 55. In addition, when the $O_2$ concentration measured by the analyzer 52 is higher than 0% and exceeds a predetermined allowable range, the concentration indicating controller 53 reduces the supply rate of oxygen gas to the oxygen gas supply nozzle 51. As a result, the slag holding furnace 2 is prevented from being unnecessarily cooled by the supply of an excess amount of oxygen gas. For example, it is preferable that the allowable range of the $O_2$ concentration be set to be 5% or lower.

When the molten slag 4 starts to be poured from the slag holding furnace 2 into the electric furnace 1, or when the pouring rate of the molten slag 4 increases, the concentration indicating controller 53 may increase the supply rate of oxygen gas to the oxygen gas supply nozzle 51 to prepare for an increase in the CO gas produced from the electric furnace 1. Information relating to the pouring rate of the molten slag 4 may be provided to the concentration indicating controller 53, for example, from a control unit (not shown) for controlling the tilting angle of the slag holding furnace 2 to control the pouring rate of the molten slag 4. In addition, instead of the concentration indicating controller 53, an operator which monitors an output value of the analyzer 52 and a pouring state of the molten slag 4 may manually operate the oxygen gas supply nozzle 51 to control the supply rate of oxygen gas as described above.

The oxygen gas supplied from the oxygen gas supply nozzle 51 is an example of the oxygen-containing gas according to the embodiment of the present invention. The oxygen-containing gas may be gas containing oxygen, for example, oxygen gas containing only oxygen as in the case of the embodiment or mixed gas containing oxygen gas and another gas (for example, nitrogen gas).

As described above, the exhaust gas g1 produced from the electric furnace 1 is discharged into the slag holding furnace 2, and the exhaust gas g2 in the slag holding furnace 2 is sucked by the blower 56 through the exhaust gas pipe 55. The internal pressure of the electric furnace 1 is adjusted to be negative by the blower 56 sucking a sufficient amount of exhaust gas g3 on an exit side of the exhaust gas pipe 55. As described above, in order to prevent the exhaust gas g1 containing CO and dust from leaking and to prevent an excess amount of dust from being sucked into the slag holding furnace 2 or the exhaust gas pipe such as the exhaust gas pipe 55, it is preferable that a negative internal pressure of the electric furnace 1 be maintained within an appropriate range. However, the emission rate of the exhaust gas g1 in the electric furnace 1 varies depending on, for example, the pouring rate of the molten slag 4 or the progress of the reduction treatment. Therefore, it is necessary to adjust the internal pressure of the electric furnace 1 according to the emission rate of the exhaust gas g1.

In the embodiment, a slit 58 is provided in the middle of the exhaust gas pipe 55 as a unit that adjusts the internal pressure of the electric furnace 1 to be negative in an appropriate range under the above-described conditions.

The slit 58 is an opening portion which is formed by cutting the entire periphery of the exhaust gas pipe 55 or a portion of the entire periphery into a slit shape. In the slit 58, the exhaust gas g2 in the exhaust gas pipe 55 is in contact with external air. Since the negative internal pressure of the exhaust gas pipe 55 is maintained in the exhaust gas pipe 55 by the blower 56, external air (symbol air1 in FIG. 5) flows into the exhaust gas pipe 55 through the slit 58. Accordingly, the exhaust gas g3, which is sucked by the blower 56 in an exhaust gas pipe 55b of the rear stage of the slit 58, contains: the exhaust gas g2 which has been discharged from the slag holding furnace 2 through the exhaust gas pipe 55a of the front stage of the slit 58; and the external air air1 which has flown from the slit 58. The slit 58 is formed with a sufficiently small width (opening area) in which the negative internal pressure of the exhaust gas pipe 55 can be maintained.

Here, it was verified from an experiment of the present inventors that the flow rate of the external air air1 flowing from the slit 58 into the exhaust gas pipe 55 varies complementarily to the flow rate of the exhaust gas g2 flowing to the slit 58 through the inside of the exhaust gas pipe 55a. For example, in a case where the air intake rate of the exhaust gas g3 using the blower 56 is 100 Nm$^3$/h, when the flow rate of the exhaust gas g2 is 80 Nm$^3$/h, the flow rate of the external air air1 is 20 Nm$^3$/h. In addition, in the same case, when the flow rate of the exhaust gas g2 is 70 Nm$^3$/h, the flow rate of the external air air1 is 30 Nm$^3$/h.

When the emission rate of the exhaust gas g1 in the electric furnace 1 increases due to the action of the slit 58, the flow rate of the exhaust gas g2 flowing through the exhaust gas pipe 55a also increases. Therefore, the flow rate of the external air air1 flowing from the slit 58 decreases. Therefore, most of the suction force of the exhaust gas g3 obtained by the blower 56 functions as the suction force of the exhaust gas g2. As a result, a high capability to exhaust the exhaust gas g1 from the electric furnace 1 can be maintained. Therefore, when the amount of the exhaust gas g1 increases irrespective of conditions under which the suction force of the blower 56 is constant, an increase in the internal pressure of the electric furnace 1 can be prevented. On the other hand, when the emission rate of the exhaust gas g1 in the electric furnace 1 decreases, the flow rate of the exhaust gas g2 flowing through the exhaust gas pipe 55a also increases. Therefore, the flow rate of the external air air1 flowing from the slit 58 increases. Therefore, most of the suction force of the exhaust gas g3 obtained by the blower 56 is distributed to the exhaust gas g2 and the external air air1. As a result, the capability to exhaust the exhaust gas g1 from the electric furnace 1 can be limited. Therefore, when the amount of the exhaust gas g1 decreases irrespective of conditions under which the suction force of the blower 56 is constant, a decrease in the internal pressure of the electric furnace 1 can be prevented. As described above, in the exhaust gas treatment facility 50 according to the embodiment, a substantially constant negative internal pressure of the electric furnace 1 can be maintained.

On the other hand, by providing a damper in, for example, the exhaust gas pipe 55 instead of the slit 58, the air intake rate of the exhaust gas using the blower 56 can be adjusted. However, in this case, complicated control of finely adjusting the opening of the damper according to the emission rate of the exhaust gas g1 is necessary. In the embodiment, the external air air1 is introduced by providing an opening portion such as the slit 58 in the middle of the exhaust gas pipe 55. As a result, the air intake rate of the exhaust gas g2 using the blower 56 is adjusted. As described above, the flow rate of the external air air1 flowing from the slit 58 is automatically adjusted according to the flow rate of the exhaust gas g2. Therefore, control of finely changing the opening of the slit 58 is unnecessary.

In the above description of the embodiment of the present invention, the slit 58 provided through the entire periphery of the exhaust gas pipe 55 has been described as an example of the opening portion through which the external air air1 is introduced into the exhaust gas pipe 55. However, the examples of the opening portion are not limited to the slit 58. For example, in another embodiment, a hole having an arbitrary shape such as a circular shape or a rectangular shape may be provided as an opening portion through a portion of the peripheral surface of the exhaust gas pipe 55, for example, a range of ⅓ or ¼ of the entire periphery.

2. Second Embodiment

Next, an exhaust gas treatment facility according to a second embodiment of the present invention will be described. The configurations of the second embodiment are substantially the same as those of the first embodiment except for configurations described below. Therefore, a detailed description of the same components as those of the first embodiment will not be repeated.

[2.1. Configuration of Exhaust Gas Treatment Facility]

Figure 6:
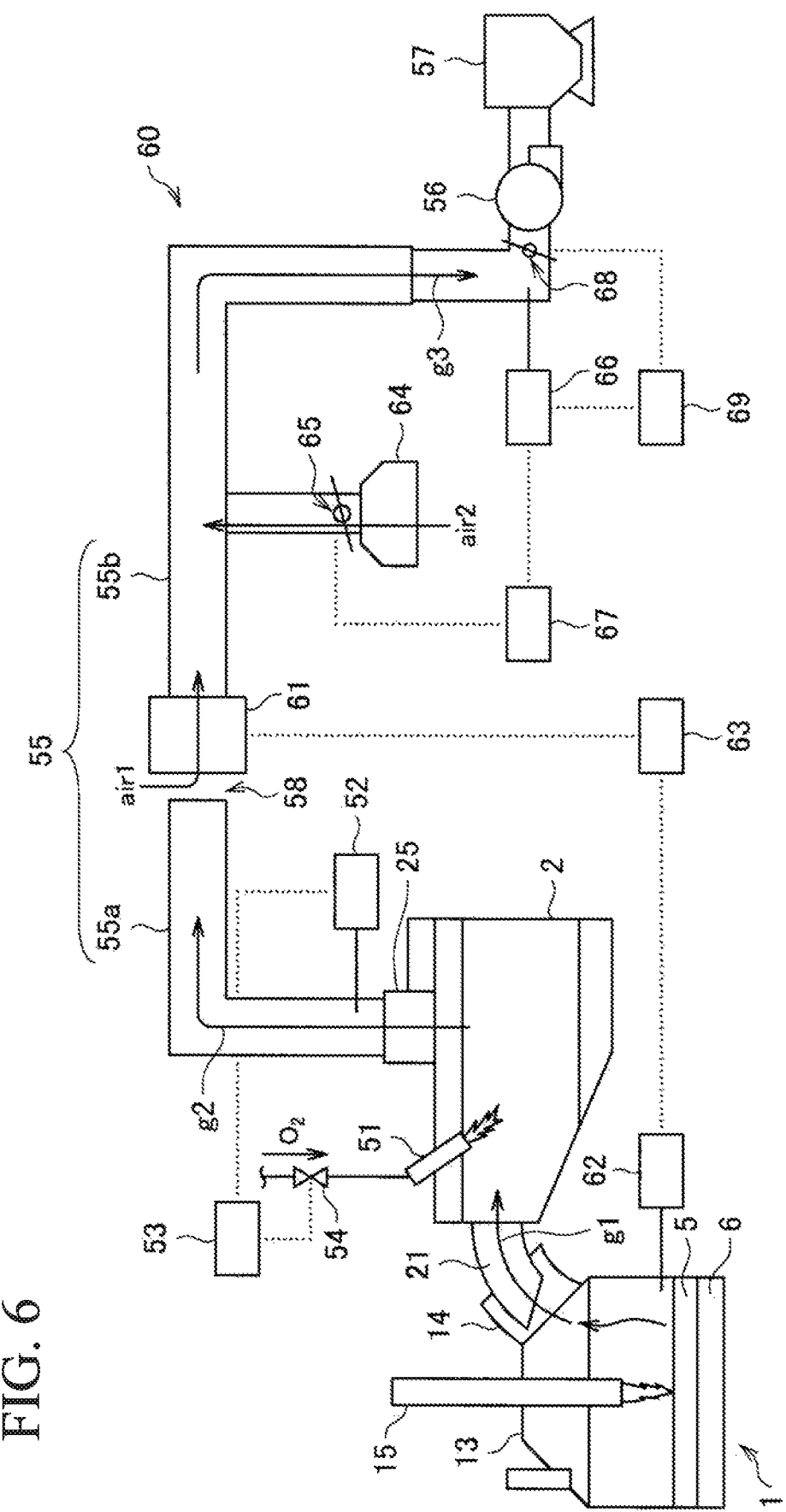
FIG. 6 is a schematic diagram showing a configuration of an exhaust gas treatment facility according to a second embodiment of the present invention.

First, the exhaust gas treatment facility according to the embodiment invention will be described with reference to FIG. 6. FIG. 6 is a schematic diagram showing a configuration of the exhaust gas treatment facility according to the embodiment.

As shown in FIG. 6, in the exhaust gas treatment facility 60, not only the slit 58 but also a sleeve 61 are provided in the middle of the exhaust gas pipe 55. The sleeve 61 is provided around the exhaust gas pipe 55 and slides along an axial direction of the exhaust gas pipe 55 so as to cover at least a portion of the slit 58. As the sleeve 61 slides to cover the slit 58, the width of the slit 58 is narrowed, and the area of an opening portion formed by the slit 58 decreases. Conversely, as the sleeve 61 covering the slit 58 slides to open the slit 58, the width of the slit 58 is widened, and the area of an opening portion formed by the slit 58 increases. In this way, in the embodiment, the sleeve 61 functions as an opening area changing unit that changes the area of the opening portion formed by the slit 58.

For example, when the inner diameter of the exhaust gas pipe 55 is 700 mm, the area of the slit 58 covered with the sleeve 61 is the smallest, and when the slit 58 is fully opened (opening: 100%), the width of the slit 58 is about 300 mm. When the sleeve 61 slides and gradually covers the slit 58 from the above state, the width of the slit 58 can be adjusted to be, for example, within a range of 50 mm to 300 mm. In this example, in order to secure a clearance between the sleeve 61 and an end portion of the exhaust gas pipe 55a, the minimum width of the slit 58 is set to be not 0 mm but 50 mm. However, in another embodiment, the sleeve 61 may fully cover the slit 58 so as to adjust the width of the slit 58 to be 0 mm. In addition, in FIG. 6, the sleeve 61 is provided on the exhaust gas pipe 55b side. However, the sleeve 61 may be provided on the exhaust gas pipe 55a side.

As described above in the first embodiment, by providing the slit 58, the internal pressure of the electric furnace 1 is adjusted according to a variation in the emission rate of the exhaust gas g1 in the electric furnace 1. However, when the width of the slit 58 is fixed as in the case of the first embodiment, there is a limit in the allowable variation range in the emission rate of the exhaust gas g1. For example, it is assumed that, in a case where the air intake rate of the exhaust gas g3 using the blower 56 is 100 Nm$^3$/h, when the flow rate of the exhaust gas g2 flowing through the exhaust gas pipe 55a is about 70 Nm$^3$/h to 80 Nm$^3$/h as described above in the first embodiment, the internal pressure of the electric furnace 1 can be automatically adjusted to be constant without changing the width of the slit 58. According to this assumption, when the emission rate of the exhaust gas g1 varies more largely (for example, according to the assumption, when the flow rate of the exhaust gas g2 decreases to about 50 Nm$^3$/h by the emission rate of the exhaust gas g1 being largely decreased), the flow rate of the external air air1 flowing from the slit 58 does not exceed 50 Nm$^3$/h. Accordingly, when the emission rate of the exhaust gas g1 varies largely, the suction force of the exhaust gas g3 using the blower 56 is concentrated on the exhaust gas g2. Thus, the capability to exhaust the exhaust gas g1 from the electric furnace 1 is excessive, and there is a problem in that the internal pressure of the electric furnace 1 decreases more than necessary.

Therefore, in the embodiment, in the above-described case, the sleeve 61 is slid such that the width of the slit 58 is widened and a larger amount of the external air air1 (in the above-described example, about 50 Nm$^3$/h) temporarily flows. As a result, the internal pressure of the electric furnace 1 is prevented from decreasing more than necessary. Next, when the flow rate of the exhaust gas g2 recovers to be, for example, about 70 Nm$^3$/h to 80 Nm$^3$/h, the sleeve 61 is slid again such that the width of the slit 58 is narrowed and the flowing of the external air air1 from the slit 58 is limited. As a result, the capability to exhaust the exhaust gas g1 from the electric furnace 1 is maintained to be high, and thus the internal pressure of the electric furnace 1 can be prevented from increasing.

In the embodiment, in order to adjust the width of the slit 58 as described above, a pressure gauge 62 (pressure detecting unit) is provided in the electric furnace 1. The pressure gauge 62 is connected to the pressure indicating controller 63. The pressure gauge 62 measures the internal pressure of the electric furnace 1. The pressure indicating controller 63 controls the width of the slit 58 by sliding the sleeve 61 according to the internal pressure of the electric furnace 1 measured by the pressure gauge 62. More specifically, when the internal pressure of the electric furnace 1 is high, the pressure indicating controller 63 narrows the width of the slit 58 by controlling a driving unit (not shown) to slide the sleeve 61. As a result, an increase in the internal pressure of the electric furnace 1 is limited. In addition, when the internal pressure of the electric furnace 1 is low, the pressure indicating controller 63 widens the width of the slit 58 by controlling the a driving unit to slide the sleeve 61. As a result, a decrease in the internal pressure of the electric furnace 1 is limited. A specific example of the sleeve control using the pressure indicating controller 63 will be described below.

When the molten slag 4 starts to be poured from the slag holding furnace 2 into the electric furnace 1, or when the pouring rate of the molten slag 4 into the electric furnace 1 increases, the pressure indicating controller 63 may slides the sleeve 61 and narrow the width of the slit 58 to prepare for an increase in the exhaust gas g1 produced from the electric furnace 1. Information relating to the pouring rate of the molten slag 4 may be provided to the pressure indicating controller 63, for example, from a control unit (not shown) for controlling the tilting angle of the slag holding furnace 2 to control the pouring rate of the molten slag 4. Alternatively, instead of the pressure indicating controller 63, an operator which monitors a measured value of the pressure gauge 62 and a pouring state of the molten slag 4 may manually operate the sleeve 61 to adjust the width of the slit 58 as described above.

Further in the exhaust gas treatment facility 60, an external air introduction port 64 may be provided through the exhaust gas pipe 55b provided between the slit 58 and the blower 56. Since the negative internal pressure of the exhaust gas pipe 55b is maintained by the suction force of the blower 56, external air (air2) flows into the exhaust gas pipe 55b through the external air introduction port 64. This external air air2 is mixed with the exhaust gas g3 flowing through the exhaust gas pipe 55b, and thus the exhaust gas g3 is cooled. Due to the action of the external air introduction port 64, the temperature of the exhaust gas g3 flowing to the dust collector 57 through the blower 56 can be decreased to be within an appropriate range. However, the temperature of the exhaust gas g3 flowing through the inside of the exhaust gas pipe 55b varies depending on the emission rate of the exhaust gas g1 in the electric furnace 1, the flow rate of the external air air1 flowing from the slit 58, and the like. The amount of the external air air2 required to cool the exhaust gas g3 to an appropriate temperature also varies depending on the emission rate of the exhaust gas g1, the flow rate of the external air air1, and the like.

Therefore, a damper 65 for adjusting the flow rate of the external air air2 is provided in the external air introduction port 64. At an exit of the exhaust gas pipe 55b on the blower 56 side, a thermometer 66 (temperature detecting unit) which detects the temperature of the exhaust gas g3 in the exhaust gas pipe 55b is provided. The opening of the damper 65 is controlled by a temperature indicating controller 67 connected to the thermometer 66. The damper 65 and the temperature indicating controller 67 function as an external air flow rate control unit that controls the flow rate of the external air air2, which is introduced through the external air introduction port 64, depending on the temperature of the exhaust gas g3. More specifically, when the temperature of the exhaust gas g3 in the exhaust gas pipe 55b is high, the temperature indicating controller 67 controls the damper 65 such that the opening of the damper 65 increases. As a result, the flow rate of the external air air2 increases, which promotes the cooling of the exhaust gas g3. In addition, when the temperature of the exhaust gas g3 is low, the temperature indicating controller 67 controls the damper 65 such that the opening of the damper 65 decreases. As a result, the flow rate of the external air air2 decreases, which limits the cooling of the exhaust gas g3. Alternatively, the damper 65 may be completely closed to stop the flowing of the external air air2 to the exhaust gas pipe 55b. In a case where the exhaust gas g3 is sufficiently cooled without the introduction of the external air air2, it is preferable that, when the temperature of the exhaust gas g3 is increased again by reducing the flow rate of the external air air2, the external air air2 is caused to flow into the exhaust gas pipe 55b so as to cool the exhaust gas g3. A specific example of the damper control using the temperature indicating controller 67 will be described below.

In addition, as in the case of other controllers, when the molten slag 4 starts to be poured from the slag holding furnace 2 into the electric furnace 1, or when the pouring rate of the molten slag 4 into the electric furnace 1 increases, the temperature indicating controller 67 may adjust the opening of the damper 65 to be large so as to prepare for an increase in the exhaust gas g1 produced from the electric furnace 1. Information relating to the pouring rate of the molten slag 4 may be provided to the temperature indicating controller 67, for example, from a control unit (not shown) for controlling the tilting angle of the slag holding furnace 2 to control the pouring rate of the molten slag 4. Alternatively, instead of the temperature indicating controller 67, an operator which monitors a measured value of the thermometer 66 and a pouring state of the molten slag 4 may manually operate the damper 65 to adjust the opening of the damper 65 as described above.

Further, in the exhaust gas treatment facility 60, when the external air introduction port 64 is provided, it is preferable that a damper 68 for adjusting the suction flow rate using the blower 56 is provided on the front stage (upper stream side) of the blower 56. The opening of the damper 68 is controlled by a temperature indicating controller 69 connected to the thermometer 66. More specifically, when the temperature of the exhaust gas g3 in the exhaust gas pipe 55b increases, the temperature indicating controller 69 controls the damper 68 such that the opening of the damper 68 increases. As a result, the suction flow rate using the blower 56 increases. In addition, when the temperature of the exhaust gas g3 decreases, the temperature indicating controller 69 controls the damper 68 such that the opening of the damper 68 decreases. As a result, the suction flow rate using the blower 56 decreases. In the example of FIG. 6, the temperature indicating controller 67 and the temperature indicating controller 69 are separately provided but may be integrated into one controller.

That is, when the temperature of the exhaust gas g3 increases, the exhaust gas g3 expands. Therefore, the gas mass per unit volume decreases. As a result, since a load on the blower 56 decreases, the suction flow rate using the blower 56 can be increased. Accordingly, the suction flow rate using the blower 56 can be increased by increasing the opening of the damper 68.

On the other hand, when the temperature of the exhaust gas g3 decreases, the exhaust gas g3 shrinks. Therefore, the gas mass per unit volume increases. As a result, a load on the blower 56 increases. In order to decrease the suction flow rate using the blower 56, it is important to decrease the suction flow rate using the blower by decreasing the opening of the damper 68 using the blower 56.

[2.2. Example of Control Method]
(Control of Internal Pressure of Electric Furnace)

Figure 7:
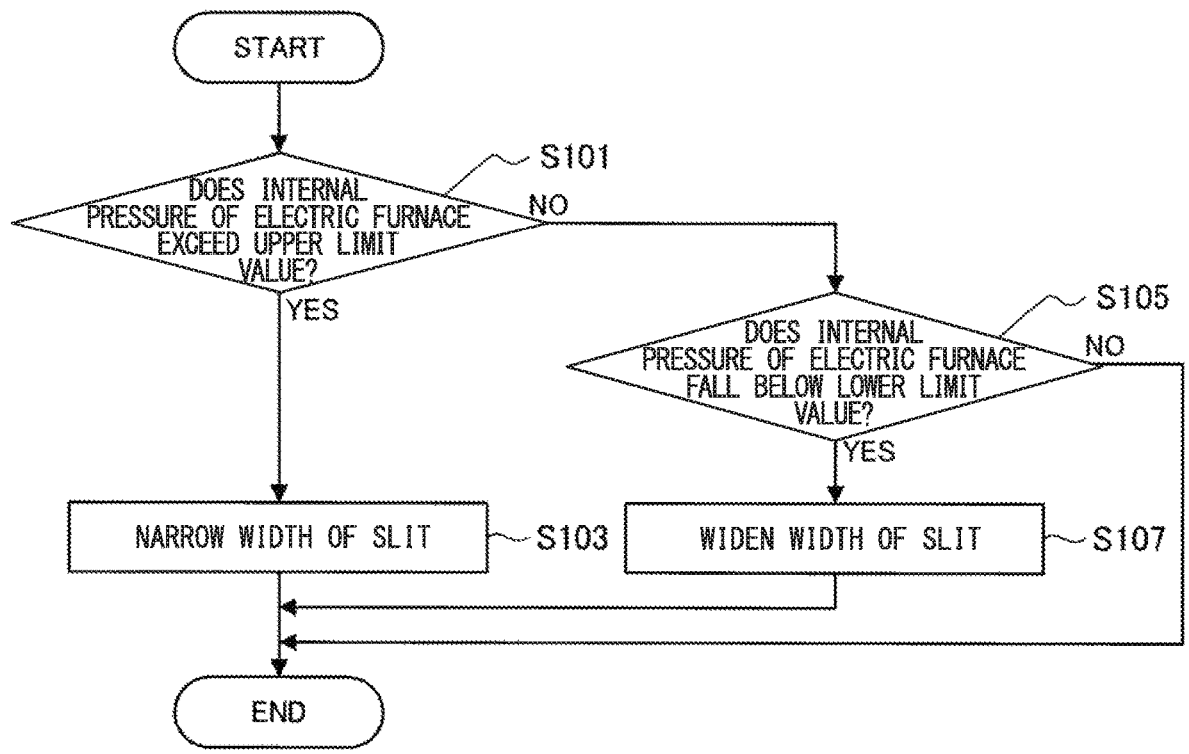
FIG. 7 is a flowchart showing an example of a control method of a pressure indicating controller according to the second embodiment of the present invention.

FIG. 7 is a flowchart showing an example of a control method of the pressure indicating controller 63 according to the second embodiment of the present invention. As described above, the pressure indicating controller 63 adjusts the width of the slit 58 by sliding the sleeve 61 according to the internal pressure of the electric furnace 1 measured by the pressure gauge 62.

As shown in FIG. 7, first, the pressure indicating controller 63 determines whether or not the internal pressure of the electric furnace 1 exceeds a predetermined upper limit value (Step S101). Here, when the internal pressure of the electric furnace 1 exceeds the upper limit value, the pressure indicating controller 63 slides the sleeve 61 to narrow the width of the slit 58 (Step S103). Therefore, the flow rate of the external air air1 flowing from the slit 58 decreases. As a result, since the capability to exhaust the exhaust gas g1 increases, the internal pressure of the electric furnace 1 can be adjusted such that the internal pressure of the electric furnace 1 does not exceed the upper limit value.

When the internal pressure of the electric furnace 1 does not exceed the upper limit value in Step S101, the pressure indicating controller 63 determines whether or not the internal pressure of the electric furnace 1 falls below a predetermined lower limit value (Step S105). Here, when the internal pressure of the electric furnace 1 falls below the lower limit value, the pressure indicating controller 63 slides the sleeve 61 to widen the width of the slit 58 (Step S107). Therefore, the flow rate of the external air air1 flowing from the slit 58 increases. As a result, since the capability to exhaust the exhaust gas g1 is limited, the internal pressure of the electric furnace 1 can be adjusted such that the internal pressure of the electric furnace 1 does not fall below the lower limit value.

When the internal pressure of the electric furnace 1 does not fall below the lower limit value in Step S105, that is, when the internal pressure of the electric furnace 1 is maintained in an appropriate range between the upper limit value and the lower limit value, the pressure indicating controller 63 fixes the sleeve 61 and maintains the width of the slit 58.

(Control of Amount of External Air for Cooling Exhaust Gas)

Figure 8:
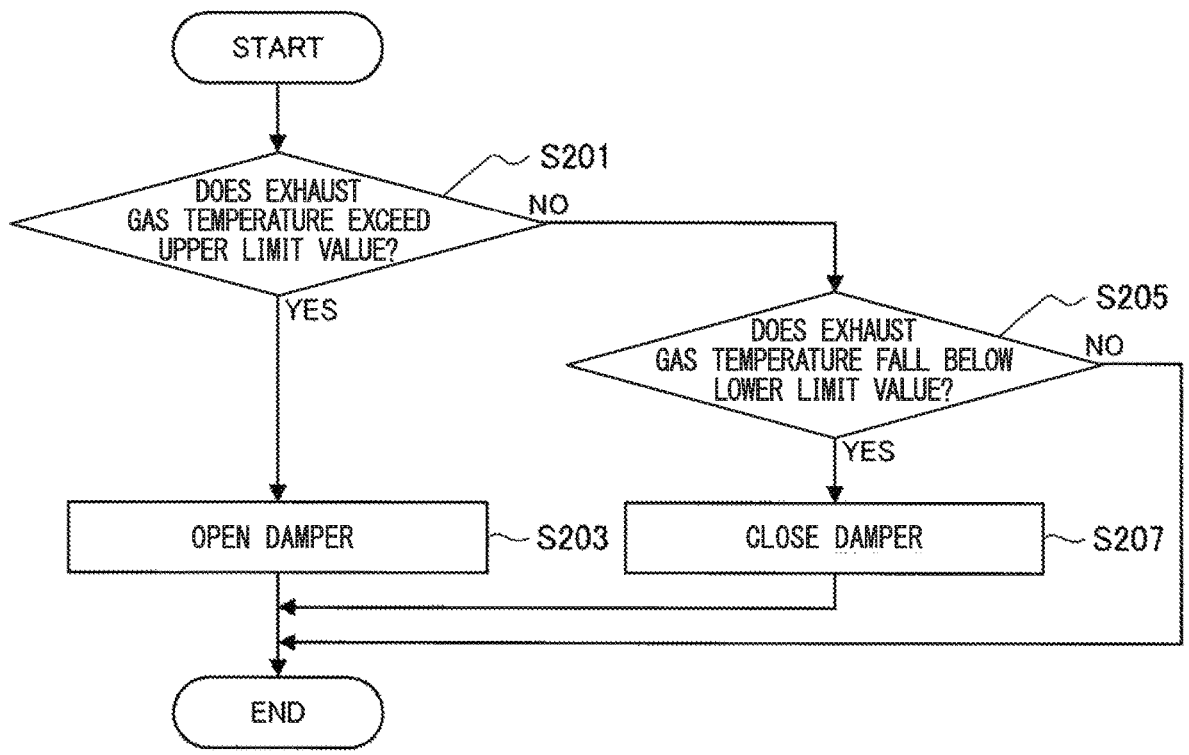
FIG. 8 is a flowchart showing an example of a control method of a temperature indicating controller according to the second embodiment of the present invention.

FIG. 8 is a flowchart showing an example of a control method of the temperature indicating controller 67 according to the second embodiment of the present invention. As described above, the temperature indicating controller 67 adjusts the opening of the damper 65, which is provided in the external air introduction port 64, according to the temperature of the exhaust gas g3 in the exhaust gas pipe 55b measured by the thermometer 66.

As shown in FIG. 8, first, the temperature indicating controller 67 determines whether or not the temperature of the exhaust gas g3 exceeds a predetermined upper limit value (Step S201). Here, when the exhaust gas temperature exceeds the upper limit value, the temperature indicating controller 67 opens the damper 65 (Step S203). Therefore, the flow rate of the external air air2 flowing from the external air introduction port 64 increases. As a result, since the exhaust gas g3 is cooled by a larger amount of the external air air2, the temperature of the exhaust gas g3 can be adjusted such that the temperature of the exhaust gas g3 does not exceed the upper limit value.

As described above, when an increase in the temperature of the exhaust gas g3 is detected by the thermometer 66, the temperature indicating controller 69 controls the damper 68 such that the opening of the damper 68 provided on the front stage of the blower 56 increases. That is, when it is determined that the temperature of the exhaust gas g3 in Step S201 exceeds the upper limit value, the opening of the damper 68 increases.

In addition, the exhaust gas g3 is cooled by the damper 65 being opened in Step S203. That is, when an increase in the temperature of the exhaust gas g3 is detected by the thermometer 66, the temperature indicating controller 67 controls the damper 65 such that the opening of the damper 65 increases. Based on the result of measuring the temperature of the exhaust gas g3 which is obtained from the thermometer 66 by the operator, the damper 65 may be manually operated such that the opening of the damper 65 is an appropriate value.

When the temperature of the exhaust gas g3 does not exceed the upper limit value in Step S201, the temperature indicating controller 67 further determines whether or not the temperature of the exhaust gas g3 falls below a predetermined lower limit value (Step S205). Here, when the temperature of the exhaust gas g3 falls below the lower limit value, the temperature indicating controller 67 closes the damper 65 (Step S207). Therefore, the flow rate of the external air air2 flowing from the external air introduction port 64 decreases. As a result, since the effect of cooling the exhaust gas g3 decreases, the temperature of the exhaust gas g3 can be adjusted such that the temperature of the exhaust gas g3 does not fall below the lower limit value.

When the temperature of the exhaust gas g3 does not fall below the lower limit value in Step S205, that is, when the temperature of the exhaust gas g3 is maintained in an appropriate range between the upper limit value and the lower limit value, the temperature indicating controller 67 maintains the opening of the damper 65.

As described above, in the second embodiment, the sleeve 61 which can change the width of the slit 58 is provided. As a result, even when a variation in the emission rate of the exhaust gas g1 is large, the internal pressure of the electric furnace 1 can be adjusted to be an appropriate value. In the second embodiment, even a variation in the emission rate of the exhaust gas g1 is small, the internal pressure of the electric furnace 1 can be automatically adjusted in a state where the width of the slit 58 is fixed as in the case of the first embodiment. Therefore, the emission rate of the exhaust gas g1 varies largely, and only when the internal pressure of the electric furnace 1 actually starts to increase, the sleeve 61 may be slid to change the width of the slit 58. Accordingly, for example, as compared to a case where the air intake rate of the exhaust gas is adjusted using the damper or the like, the internal pressure of the electric furnace 1 can be significantly easily controlled. In addition, even when the emission rate of the exhaust gas g1 and the flow rate of the external air air1 flowing from the slit 58 varies largely, the exhaust gas g3 cooled to an appropriate temperature can be discharged from the blower 56 to the dust collector 57 by changing the opening of the damper 65 provided in the external air introduction port 64.

In the second embodiment, as an example of the opening area changing unit, the sleeve 61 for adjusting the width of the slit 58, which is provided through the entire periphery of the exhaust gas pipe 55, is used. However, the examples of the opening area changing unit are not limited to the sleeve 61. For example, in another embodiment, a slide cover may be provided to cover at least a part of a hole (opening portion) having an arbitrary shape such as a circular shape or a rectangular shape which is provided through a portion of the peripheral surface of the exhaust gas pipe 55, for example, a range of ⅓ or ¼ of the entire periphery. This cover can adjust a proportion of the hole by being slid, for example, in a peripheral direction of the exhaust gas pipe 55 or in an axial direction of the exhaust gas pipe 55.

In addition, in FIG. 6, the concentration indicating controller 53, the pressure indicating controller 63, the temperature indicating controller 67, and the temperature indicating controller 69 are separately shown. However, these controllers may be integrated into one controller by, for example, using a computer.

In addition, it is preferable that the slit 58 and the sleeve 61 is arranged at a position of the exhaust gas pipe 55 which is as close to the slag holding furnace 2 as possible. As a result, control responsiveness of the internal pressure of the electric furnace 1 can be improved. Further, when the slit 58 is arranged at a position of the exhaust gas pipe 55 close to the slag holding furnace 2, the exhaust gas g1 having a high temperature introduced from the slag holding furnace 2 into the exhaust gas pipe 55 is mixed with the external air air1 introduced from the slit 58 into the exhaust gas pipe 55. As a result, unburned gas contained in the exhaust gas g1 can be burned in the exhaust gas pipe 55.

In addition, the plural slits 58 may be provided along the exhaust gas pipe 55. In this case, the total opening area of the plural slits 58 may be controlled by extending a movable range of the sleeve 61 to control the position of the sleeve 61. In addition, the total opening area of the plural slits 58 may be controlled by providing the sleeves 61 corresponding to the plural slits 58 to control the position of each of the sleeves 61.

EXAMPLES

Next, an example of the present invention will be described. The following example is merely a condition example which is adopted to verify the operability and effects of the present invention, and the present invention is not limited to conditions of the following example.

In the example of the present invention, a closed direct current electric furnace was used as the electric furnace 1. As the molten slag 4, molten slag discharged from a converter was used. The fluid molten slag 4 in a state of being melted was poured into the slag holding furnace 2. Further, in the electric furnace 1, the molten iron layer 6 formed of about 130 tons of molten steel was formed, and the molten slag layer 5 having a thickness of about 200 mm formed of the reduced molten slag 4 (that is, reducing slag) was present on the molten iron layer 6. Under this condition, the molten slag 4 was intermittently poured from the slag holding furnace 2 into the molten slag layer 5 of the electric furnace 1. More specifically, by changing the posture of the slag holding furnace 2 from the holding posture to the pouring posture, a step (slag pouring step) of pouring 8.2 tons to 8.5 tons of the molten slag 4 into the electric furnace 1 was performed. After the posture of the slag holding furnace 2 returned to the holding posture, a step (interval step) of maintaining the holding posture for about 10 minutes was performed. By repeating the slag pouring step and the interval step, the molten slag 4 in the electric furnace 1 was reduced. As a result, the molten slag 4 was able to be continuously and stably reduced in the electric furnace 1 without causing rapid slag foaming to occur during the slag pouring.

(Slag Pouring Step)

Figure 9A:
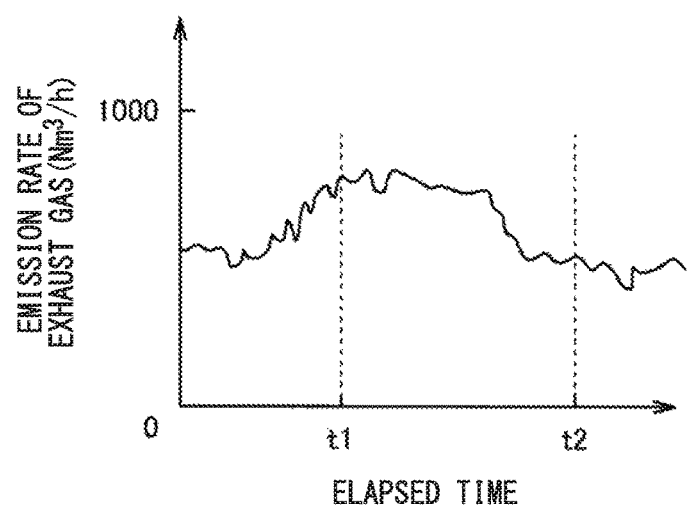
FIG. 9A is a graph showing a relationship between an emission rate of exhaust gas (emission rate of exhaust gas g1 in an electric furnace 1) and an elapsed time in a slag pouring step according to an example of the present invention.
Figure 9B:
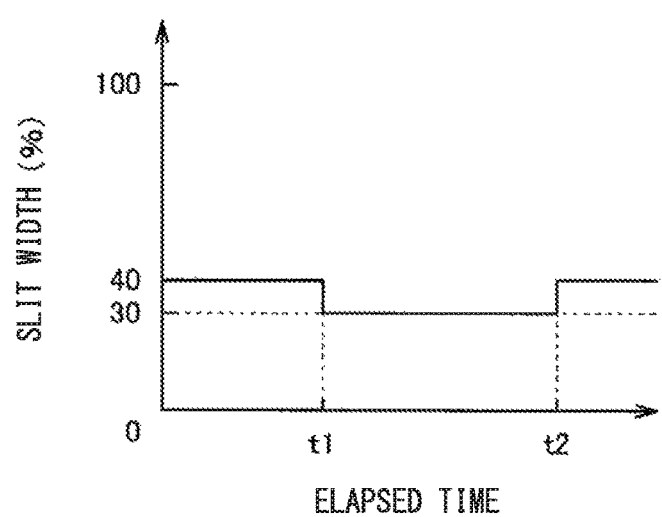
FIG. 9B is a graph showing a relationship between a slit width (width of a slit 58) and the elapsed time in the slag pouring step according to the example of the present invention.
Figure 9C:
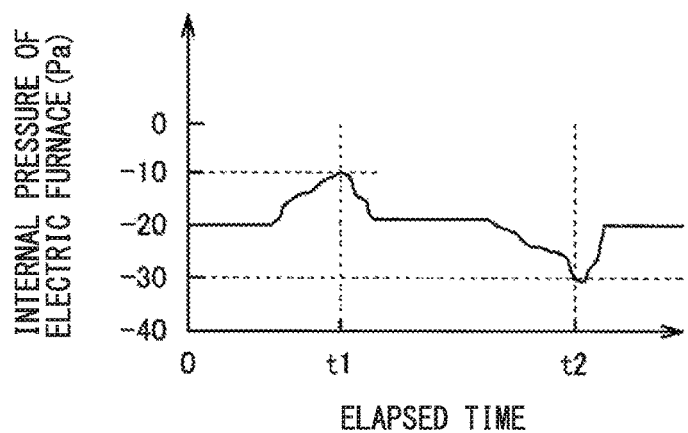
FIG. 9C is a graph showing a relationship between an internal pressure of the electric furnace 1 and the elapsed time in the slag pouring step according to the example of the present invention.

FIG. 9A is a graph showing a relationship between an emission rate of exhaust gas (emission rate of the exhaust gas g1 in the electric furnace 1) and an elapsed time in the slag pouring step according to the example of the present invention. FIG. 9B is a graph showing a relationship between a slit width (width of a slit 58) and the elapsed time in the slag pouring step according to the example of the present invention. FIG. 9C is a graph showing a relationship between an internal pressure of the electric furnace 1 and the elapsed time in the slag pouring step according to the example of the present invention. In the initial stage of the slag pouring step, in order to rapidly progress the reduction reaction, as shown in FIG. 9A, the emission rate of the exhaust gas g1 in the electric furnace 1 continuously increased from the start of the treatment to a time t1. As a result, as shown in FIG. 9C, the internal pressure of the electric furnace 1 reached a predetermined upper limit value (−10 Pa) at the time t1. Therefore, the pressure indicating controller 63 slid the sleeve 61 such that the width (opening) of the slit 58 was narrowed from 40% to 30% as shown in FIG. 9B. Therefore, the flowing of the external air air1 in the slit 58 was limited, and thus the capability to exhaust the exhaust gas g1 using the blower 56 increased. As a result, as shown in FIG. 9C, after the time t1, the internal pressure of the electric furnace 1 decreased from the upper limit value and then was maintained at a substantially constant value (−20 Pa). In this way, as the internal pressure of the electric furnace 1 approached the upper limit value, the emission rate of the exhaust gas g1 increased. In this case, by changing the width of the slit 58 from 40% to 30%, the internal pressure of the electric furnace 1 was able to be automatically adjusted to be the substantially constant value.

However, as shown in FIG. 9A, after the time t1, the emission rate of the exhaust gas g1 in the electric furnace 1 started to gradually decrease and continuously decreased until a time t2. As a result, as shown in FIG. 9C, the internal pressure of the electric furnace 1 started to decrease from the substantially constant value (−20 Pa) and reached a predetermined lower limit value (−30 Pa) at the time t2. Therefore, the pressure indicating controller 63 slid the sleeve 61 such that the width (opening) of the slit 58 was widened again from 30% to 40% as shown in FIG. 9B. Therefore, the flowing of the external air air1 in the slit 58 was promoted, and thus the capability to exhaust the exhaust gas g1 using the blower 56 was limited. As a result, as shown in FIG. 9C, after the time t2, the internal pressure of the electric furnace 1 increased from the lower limit value and then was maintained again at the substantially constant value (−20 Pa). In this way, as the internal pressure of the electric furnace 1 approached the lower limit value, the emission rate of the exhaust gas g1 decreased. In this case, by changing the width of the slit 58 from 30% to 40%, the internal pressure of the electric furnace 1 was able to be automatically adjusted to be the substantially constant value.

Figure 10A:
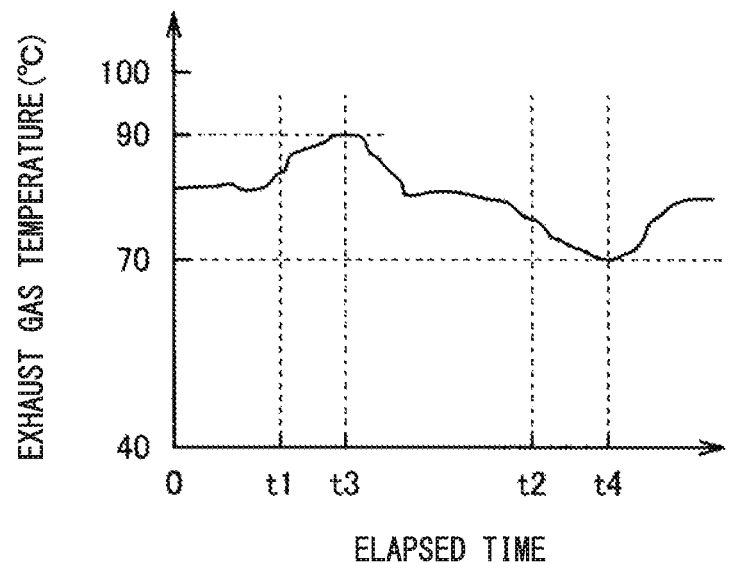
FIG. 10A is a graph showing a relationship between an exhaust gas temperature (temperature of exhaust gas g3) and the elapsed time in the slag pouring step according to the example of the present invention.
Figure 10B:
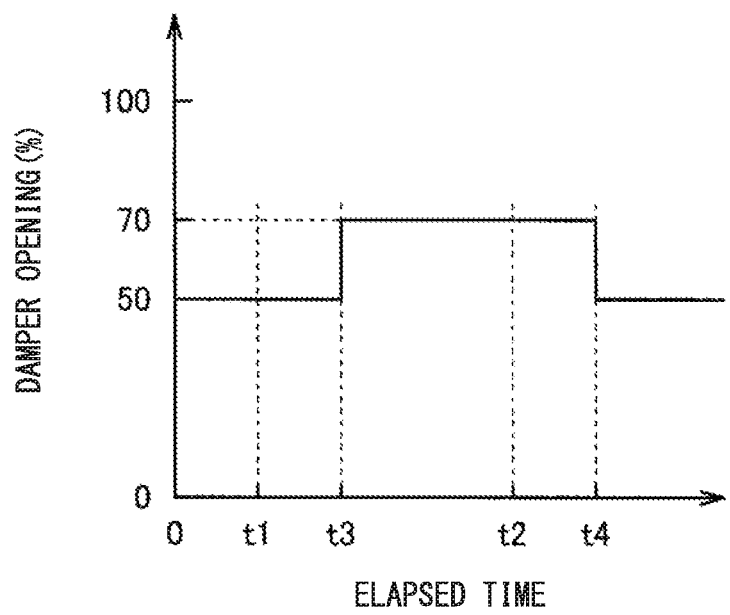
FIG. 10B is a graph showing a relationship between a damper opening (opening of a damper 65) and the elapsed time in the slag pouring step according to the example of the present invention.

FIG. 10A is a graph showing a relationship between an exhaust gas temperature (temperature of the exhaust gas g3) and the elapsed time in the slag pouring step according to the example of the present invention. FIG. 10B is a graph showing a relationship between a damper opening (opening of the damper 65) and the elapsed time in the slag pouring step according to the example of the present invention. As shown in FIG. 9B, in the slag pouring step according to the example of the present invention, the width (opening) of the slit 58 was narrowed from 40% to 30% at the time t1. As a result, the proportion of the external air air1 contained in the exhaust gas g3 flowing through the exhaust gas pipe 55b decreased. Therefore, as shown in FIG. 10A, the temperature of the exhaust gas g3 largely increased after the time t1 and reached a predetermined upper limit value (90° C.) at a time t3. Accordingly, as shown in FIG. 10B, the temperature indicating controller 67 changed the opening of the damper 65 from 50% to 70% at the time t3. Thus, due to an increase in the flow rate of the external air air2 flowing from the external air introduction port 64, the exhaust gas g3 was cooled by a larger amount of the external air air2. As a result, as shown in FIG. 10A, after the time t3, the temperature of the exhaust gas g3 decreased from the upper limit value and was maintained in an appropriate range of lower than 90° C. while being slightly varied.

However, as described above, at the time t2, the width of the slit 58 was widened again from 30% to 40%. As a result, the proportion of the external air air1 contained in the exhaust gas g3 increased. That is, the exhaust gas g3 was cooled to some extent by the external air air1 flowing from the slit 58 and then was further cooled by the external air air2 flowing from the external air introduction port 64. Therefore, as shown in FIG. 10A, the temperature of the exhaust gas g3 largely increased after the time t2 and reached a predetermined lower limit value (70° C.) at a time t4. Accordingly, as shown in FIG. 10B the temperature indicating controller 67 returned the opening of the damper 65 from 70% to 50% at the time t4. Thus, due to a decrease in the flow rate of the external air air2, the exhaust gas g3 was prevented from being excessively cooled. As a result, as shown in FIG. 10A, after the time t4, the temperature of the exhaust gas g3 increased from the lower limit value and was maintained again in an appropriate range of 70° C. to 90° C.

(Interval Step of Slag Pouring)

Figure 11A:
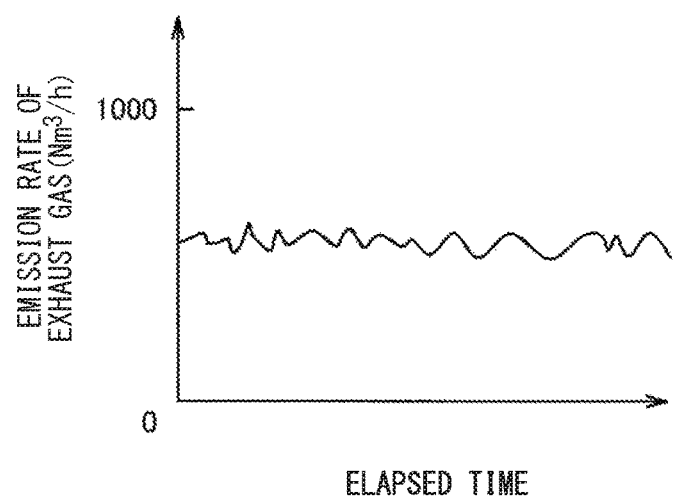
FIG. 11A is a graph showing a relationship between the emission rate of exhaust gas (emission rate of exhaust gas g1 in the electric furnace 1) and the elapsed time in an interval step according to the example of the present invention.
Figure 11B:
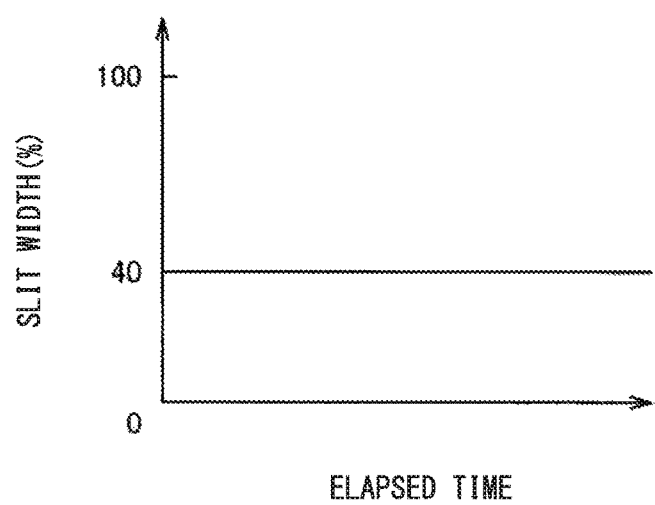
FIG. 11B is a graph showing a relationship between the slit width (width of the slit 58) and the elapsed time in the interval step according to the example of the present invention.
Figure 11C:
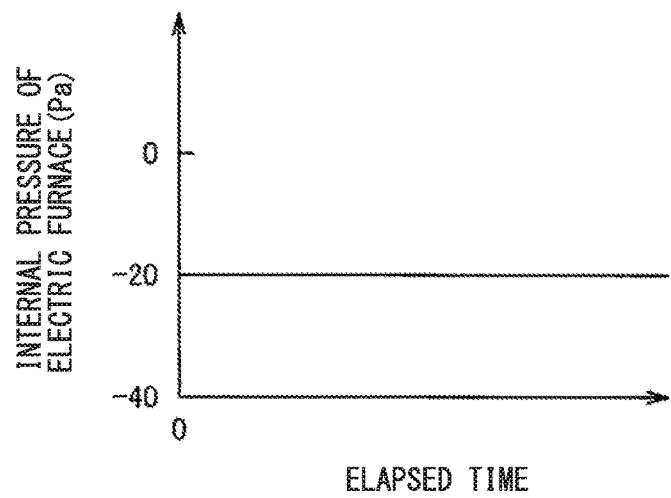
FIG. 11C is a graph showing a relationship between the internal pressure of the electric furnace 1 and the elapsed time in the interval step according to the example of the present invention.

FIG. 11A is a graph showing a relationship between the emission rate of exhaust gas (emission rate of the exhaust gas g1 in the electric furnace 1) and the elapsed time in the interval step according to the example of the present invention. FIG. 11B is a graph showing a relationship between the slit width (width of the slit 58) and the elapsed time in the interval step according to the example of the present invention. FIG. 11C is a graph showing a relationship between the internal pressure of the electric furnace 1 and the elapsed time in the interval step according to the example of the present invention. After the slag pouring step, the reduction reaction in the electric furnace 1 was stabilized in the interval step of stopping slag pouring. However, even in the interval step, the reduction reaction was not completely uniform. Therefore, as shown in FIG. 11A, the emission rate of the exhaust gas g1 in the electric furnace 1 slightly varied. On the other hand, as shown in FIG. 11B, the width (opening) of the slit 58 was fixed 40%. Even in this case, as shown in FIG. 11C, the internal pressure of the electric furnace 1 measured by the pressure gauge 62 was substantially constant at −20 Pa. In this interval step, the opening of the damper 65 was maintained at 50%, and the temperature of the exhaust gas g3 was not largely changed. Therefore, a relationship between the temperature of the exhaust gas g3 and the opening of the damper 65 was not shown.

From the above results, it was verified that, even when a variation in the emission rate of the exhaust gas g1 in the electric furnace 1 is relatively large, the internal pressure of the electric furnace 1 can be adjusted to be substantially constant by changing the width of the slit 58 depending on the internal pressure of the electric furnace 1. In addition, it was also verified that, even when the temperature of the exhaust gas g3 in the exhaust gas pipe 55b varies due to, for example, a variation in the width of the slit 58, the temperature of the exhaust gas g3 can be adjusted to be substantially constant by changing the opening of the damper 65 depending on the temperature of the exhaust gas g3. Further, it was also verified that, when the reduction reaction in the electric furnace 1 was stable and a variation in the emission rate of the exhaust gas, the internal pressure of the electric furnace 1 can be adjusted to be substantially constant in a state where the width of the slit 58 is fixed.

Hereinabove, the preferable embodiments of the present invention have been described in detail with reference to the accompanying drawings. However, the present invention is not limited to these embodiments. It is apparent that those having ordinary skill in the technical field to which the present invention pertains can conceive various alternation examples or modification examples within a scope of technical ideas described in claims, and it would be understood that these examples belong to the technical scope of the invention.

DESCRIPTION OF THE REFERENCE SYMBOLS

1: ELECTRIC FURNACE
2: SLAG HOLDING FURNACE
3: SLAG LADLE
4: MOLTEN SLAG
5: MOLTEN SLAG LAYER
6: MOLTEN IRON LAYER
14: SLAG POURING PORT
15: UPPER ELECTRODE
16: FURNACE BOTTOM ELECTRODE
17: SLAG HOLE
18: TAP HOLE
50, 60: EXHAUST GAS TREATMENT FACILITY
51: OXYGEN GAS SUPPLY NOZZLE
52: ANALYZER
53: CONCENTRATION INDICATING CONTROLLER
55: EXHAUST GAS PIPE
56: BLOWER
57: DUST COLLECTOR
58: SLIT
61: SLEEVE
62: PRESSURE GAUGE
63: PRESSURE INDICATING CONTROLLER
64: EXTERNAL AIR INTRODUCTION PORT
65: DAMPER
66: THERMOMETER
67: TEMPERATURE INDICATING CONTROLLER
g1, g2, g3: EXHAUST GAS

What is claimed is:

1. An exhaust gas treatment method in a slag treatment process in which molten slag produced in a steelmaking step is charged into a slag holding furnace, the molten slag is poured from the slag holding furnace into a closed electric furnace, which accommodates a molten iron layer and a molten slag layer formed on the molten iron layer, the molten slag is continuously reduced in the electric furnace, and valuable materials in the molten slag are collected into the molten iron layer, the method comprising:

burning a combustible component in exhaust gas by causing the exhaust gas, which is produced in the electric furnace, to flow into the slag holding furnace and supplying oxygen-containing gas into the slag holding furnace;

causing the burned exhaust gas to flow from the slag holding furnace to a suction device through an exhaust gas pipe such that internal pressure of the slag holding furnace and the exhaust gas pipe are negative;

adjusting an internal pressure of the electric furnace to be negative in a range between an upper limit value of −10 Pa and a lower limit value of −30 Pa by introducing external air into the exhaust gas pipe through an opening portion provided in a middle of the exhaust gas pipe and varying a flow rate of the external air flowing from the opening portion into the exhaust gas pipe and also varying a flow rate of exhaust gas flowing to the opening portion through an inside of the exhaust gas pipe from the slag holding furnace, such that a sum of the flow rate of the external air flowing from the opening portion into the exhaust gas pipe and the flow rate of the exhaust gas flowing to the opening portion through the inside of the exhaust gas pipe from the slag holding furnace equals a flow rate of exhaust gas flowing into the suction device; and decreasing an area of the opening portion when the internal pressure of the electric furnace exceeds the upper limit value, increasing the area of the opening portion when the internal pressure of the electric furnace falls below the lower limit value, and maintaining the area of the opening portion when the internal pressure of the electric furnace does not exceed the upper limit value and when the internal pressure of the electric furnace does not fall below the lower limit value by using an opening area changing unit provided in the opening portion.

2. The exhaust gas treatment method according to claim 1, further comprising:

cooling the exhaust gas in the exhaust gas pipe by introducing external air into the exhaust gas pipe through an external air introduction port provided between the opening portion and the suction device.

3. The exhaust gas treatment method according to claim 2, further comprising:

changing a flow rate of the external air, which is introduced through the external air introduction port, depending on a variation in temperature of the exhaust gas in the exhaust gas pipe between the opening portion and the suction device.

* * * * *